(12) United States Patent
Ohta et al.

(10) Patent No.: US 10,117,264 B2
(45) Date of Patent: Oct. 30, 2018

(54) ALLOCATION METHOD, RADIO COMMUNICATION SYSTEM, ALLOCATION APPARATUS, AND PROGRAM THEREOF

(71) Applicant: NEC Corporation, Minato-ku, Tokyo (JP)

(72) Inventors: Daisuke Ohta, Tokyo (JP); Takahiro Nobukiyo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 111 days.

(21) Appl. No.: 15/038,136

(22) PCT Filed: Nov. 17, 2014

(86) PCT No.: PCT/JP2014/080338
§ 371 (c)(1),
(2) Date: May 20, 2016

(87) PCT Pub. No.: WO2015/079948
PCT Pub. Date: Jun. 4, 2015

(65) Prior Publication Data
US 2016/0295604 A1    Oct. 6, 2016

(30) Foreign Application Priority Data

Nov. 29, 2013    (JP) .................................. 2013-247049

(51) Int. Cl.
*H04W 72/12* (2009.01)
*H04J 11/00* (2006.01)
(Continued)

(52) U.S. Cl.
CPC ......... *H04W 72/1252* (2013.01); *H04J 11/00* (2013.01); *H04L 5/0057* (2013.01);
(Continued)

(58) Field of Classification Search
CPC ......... H04W 72/0453; H04W 72/1252; H04W 72/1226; H04W 88/085; H04W 88/08; H04J 11/00; H04L 5/0057
See application file for complete search history.

(56) References Cited

U.S. PATENT DOCUMENTS

| 8,526,307 B2 | 9/2013 | Jeong | |
| 2007/0223440 A1* | 9/2007 | Ho | .................. H04W 72/042 370/342 |

(Continued)

FOREIGN PATENT DOCUMENTS

| JP | 2010-161598 A | 7/2010 |
| JP | 2012-019313 A | 1/2012 |

(Continued)

OTHER PUBLICATIONS

Christian Wengerter et al., "Fairness and Throughput Analysis for Generalized Proportional Fair Frequency Scheduling in OFDMA", VTC 2005—Spring. 2005 IEEE 61st (vol. 3), May 30-Jun. 1, 2005, Stockholm, Sweden English Abstract.

(Continued)

*Primary Examiner* — Kwang B Yao
*Assistant Examiner* — Ricardo Castaneyra

(57) ABSTRACT

The application provides a CA scheduling scheme, a base station, a radio communication system and a program to allocate radio resources based on allocation indexes calculated using the bandwidths of component carriers and traffic loads. A frequency block allocation method is for a radio communication system in which a radio station and mobile stations perform radio communication using a frequency block selected from a plurality of system bands. The method comprises an allocation number determination step of determining number of system bands that can allocate to each mobile station; a communication band index calculation step of calculating a communication band index based on band- (Continued)

widths and loads of the system bands according to the determined allocation number; an allocation index calculation step of calculating an allocation index of the mobile station for each of the system bands using the communication band index and a frequency block allocation step of allocating frequency blocks to the mobile station based on the allocation indices.

9 Claims, 17 Drawing Sheets

(51) Int. Cl.
  *H04L 5/00* (2006.01)
  *H04W 72/04* (2009.01)
  *H04W 88/08* (2009.01)
(52) U.S. Cl.
  CPC ... *H04W 72/0453* (2013.01); *H04W 72/1226* (2013.01); *H04W 88/08* (2013.01); *H04W 88/085* (2013.01)

(56) References Cited

U.S. PATENT DOCUMENTS

| | | |
|---|---|---|
| 2012/0033625 A1 | 2/2012 | Nagata et al. |
| 2013/0188609 A1* | 7/2013 | Harada ............... H04W 72/044 370/336 |
| 2013/0208589 A1 | 8/2013 | Lopez Toledo et al. |

FOREIGN PATENT DOCUMENTS

| | | |
|---|---|---|
| JP | 2012-186783 A | 9/2012 |
| WO | 2012/034702 A1 | 3/2012 |

OTHER PUBLICATIONS

Mikiko Iwamura et al., "Carrier Aggregation framework in 3GPP LTE-Advanced", IEEE, Communication Magazine, vol. 48, No. 8, pp. 60-67, Aug. 2010 English Abstract.
Yuanye Wang et al., "Carrier Load Balancing and Packet Scheduling for Multi-Carrier Systems", IEEE Transactions Wireless Communications, vol. 9, No. 5, May 2010 English Abstract.
International Search Report for PCT Application No. PCT/JP2014/080338, dated Feb. 17, 2015.
English translation of Written opinion for PCT Application No. PCT/JP2014/080338.
Xiaolin Cheng et al., "Joint Carrier Aggregation and Packet Scheduling in LTE-Advanced Networks", 2013 IEEE International Conference on Sensing, Communication and Networking (SECON), 2013, pp. 469-477.
Li Chen et al., "Analysis and Simulation for Spectrum Aggregation in LTE-Advanced System", Vehicular Technology Conference Fall (VTC 2009—Fall), IEEE, 2009, total 6 pages.
Zhao Ji-Hong, et al., "A SPF-PF crossing Component Carrier joint scheduling algorithm", ICACT 2012, Feb. 19-22, 2012, pp. 173-177.
Communication dated Jun. 28, 2017 from the European Patent Office in counterpart Application No. 14866680.3.
Japanese Office Action for JP Application No. 2015-550650 dated Sep. 11, 2018 with English Translation.

* cited by examiner

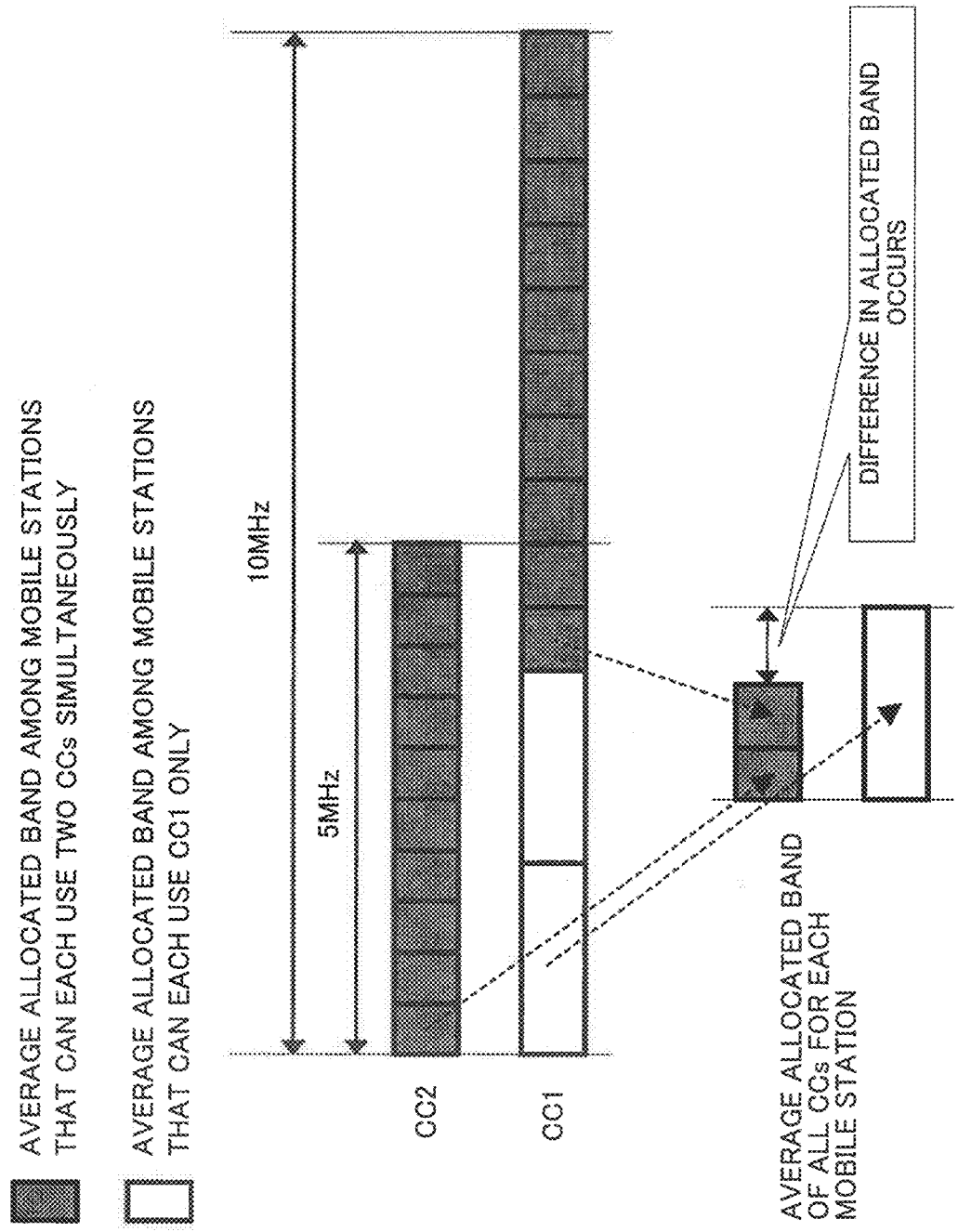

ALLOCATION METHOD, RADIO COMMUNICATION SYSTEM, ALLOCATION APPARATUS, AND PROGRAM THEREOF

This application is a National Stage Entry of PCT/JP2014/080338 filed on Nov. 17, 2014, which claims priority from Japanese Patent Application 2013-247049 filed on Nov. 29, 2013, the contents of all of which are incorporated herein by reference, in their entirety.

TECHNICAL FIELD

The preset invention relates to an allocation method, a radio communication system, an allocation apparatus, and a program thereof.

BACKGROUND ART

Radio communication systems based on, for example, Long Term Evolution (LTE) standardized by the Third Generation Partnership Project (3GPP) usually use, in the allocation of radio resources to mobile stations, proportional fairness (PF) schedulers capable of achieving fairness of throughputs among the mobile stations while ensuring appropriate radio capacities (NPL 1). Fairness of throughputs among mobile stations means to reduce the difference in throughput among the mobile stations. A PF scheduler allocates radio resources on the basis of allocation indices $M^{(PF)}$ each calculated by the use of an instantaneous rate and an average rate, which are expected upon allocation of the radio resources. Equation (1) is a formula for calculating $M^{(PF)}$. In Equation (1), i denotes the identification number of a radio bearer; k, the identification number of a resource block (RB); r, an instantaneous rate; T, an average rate; and a, a weighting factor. A radio bearer is a logical radio communication network established when a mobile station is to receive communication service, such as mailing or browsing service. An RB is the smallest frequency block unit for allocation that can be allocated to a mobile station in LTE. An instantaneous rate is the number of transmission bits per RB determined according to channel quality cyclically reported by the mobile station. In LTE, an instantaneous rate is usually set at a transport block size (TBS) per RB that can be transmitted in a modulation and coding scheme (MCS) determined according to the channel quality obtained by converting a channel quality indicator (CQI) included in channel state information (CSI) cyclically reported by the mobile station. An average rate is the average number of transmission bits per RB allocated to the mobile station and is calculated according to Equation (2). In Equation (2), ω denotes a weighting factor (0≤ω≤1), and δ is a variable taking one when the RB is an RB allocated to a mobile station i while taking zero when the RB is an RB other than that. When no RB is allocated to the mobile station, δ takes zero, whereby T is updated to a smaller value. Therefore, with Equation (2), an effective average rate taking allocation frequency into account can be calculated.

[Math. 1]

$$M_{i,k}^{(PF)} = \frac{r_{i,k}}{T_i^\alpha} \quad \text{Equation (1)}$$

[Math. 2]

$$T_i = (1-\omega)T_i + \omega \cdot \sum_k (\delta_{i,k} \cdot r_{i,k}) \quad \text{Equation (2)}$$

By allocating radio resources to mobile stations each having a large allocation index calculated according to Equation (1), allocation of RBs to the mobile stations resulting in a high instantaneous channel quality relative to the average channel quality is prioritized, thereby making it possible to increase radio capacities. In addition, since the average rate decreases when no radio resource is allocated, the possibility of allocation increases in the next allocation opportunity. This prevents even a mobile station having a low channel quality from losing an allocation opportunity, and fairness of allocation opportunities among the mobile stations is achieved. Therefore, it is possible to increase the lowest throughput of the mobile stations in a radio communication system.

In the 3GPP, LTE-Advanced is being considered as a radio communication system subsequent to LTE. In LTE-Advanced, expansion of the maximum system bandwidth to 20 MHz or more has been considered to enable high-speed and large-capacity communications compared with LTE. However, it is not easy to ensure a continuous wide-band frequency domain in the current situation where various frequency bands are allocated for various uses. In view of this, a technique called carrier aggregation (CA) is being considered for LTE-Advanced, CA being for securing a bandwidth of 100 MHz at maximum by aggregating multiple system carriers each having a bandwidth of 20 MHz or narrower to enable wide-band communications (NPL 2). Each system carrier used in CA is called component carrier (CC). Mobile stations capable of CA can transmit and receive data by using multiple CCs simultaneously enabling high-speed communications.

The number of CCs possible for a mobile station to use simultaneously depends on the reception environment of the mobile station. For this reason, in some cases, there may be mobile stations with different number of CCs that can be used simultaneously. An example of such a case is a scenario, as in FIG. 11, in which a single radio station controls two CCs having different frequency bands and the CCs use the same transmission power. Since propagation loss is larger in higher frequencies, in FIG. 11, a signal from the CC of high frequencies does not reach a mobile station located in an area distant from the radio station, and therefore, the mobile station can use only the CC of low frequencies. In another scenario, as in FIG. 12, a remote radio head (RRH), which is configured by separating only a transmission/reception function from the functions of the radio station, is provided additionally to each local area having particularly intensive needs of traffic, in a communication area formed by a radio station, and one of two CCs controlled by the radio station is allocated to the RRHs. This can effectively increase radio capacities at low cost. In this case, a signal from any of the RRHs does not reach a mobile station distant from the RRH, and therefore, the mobile station can use only the CC of low frequencies as in the preceding scenario. When the above-described PF scheduler is employed in such a scenario, each allocation index needs to be calculated for each CC by using the average number of transmission bits among the allocated RB as the average rate. Accordingly, fairness of allocation opportunities is achieved in each CC only among the mobile stations to which a signal from the CC is received. On a system-wide level, a mobile station having a small number of CCs that can be used simultaneously has fewer allocation opportunities than those for a mobile station having a large number of CCs that can be used simultaneously. Therefore, fairness of throughputs among mobile stations is not achieved with this technique.

In view of the above, an improved PF scheduler has been proposed, the PF scheduler being configured to calculate each allocation index by using the total of the average rates calculated for each of all CCs (NPL 3). Equation (3) is a formula for calculating an allocation index by the improved PF scheduler. In Equation (3), c denotes the identification number of a CC.

[Math. 3]

$$M_{i,c,k}^{(PF)} = \frac{r_{i,c,k}}{\left(\sum_c T_{i,c}\right)^\alpha} \quad \text{Equation (3)}$$

According to Equation (3), a mobile station having a large number of CCs that can be used simultaneously has a high average rate in the entire system band compared with a mobile station having a small number of CCs that can be used simultaneously, and is accordingly assigned a small allocation index. As a result, a mobile station having a small number of CCs that can be used simultaneously has more allocation opportunities than those for a mobile station having a large number of CCs that can be used simultaneously, in a CC of low frequencies. Therefore, using this scheduler can increase throughputs compared with the case of a PF scheduler configured to calculate the average rate separately for each CC. To increase throughputs further, a method of calculating an allocation index M in consideration of the number of CCs that can be used simultaneously (referred to as general method below) has been proposed (PTL 1). Equation (4) is a method of calculating an allocation index in the general method. In Equation (4), $N^{(CC)}$ denotes the number of CCs that can be used simultaneously. According to Equation (4), a mobile station having a large number of CCs that can be used simultaneously is assigned the allocation index M of a smaller value than that calculated according to Equation (3), whereby the mobile station having a small number of CCs that can be used simultaneously can have more allocation opportunities than those for the case of Equation (3). This consequently increases fairness of throughputs among mobile stations compared with the case of using Equation (3).

[Math. 4]

$$M_{i,c,k} = \frac{1}{N_i^{(cc)}} \cdot M_{i,c,k}^{(PF)} \quad \text{Equation (4)}$$

CITATION LIST

Patent Literature

PTL 1: Japanese Laid-open Patent Publication No. 2012-19313

Non Patent Literature

NPL 1: Christian Wengerter et al., "Fairness and Throughput Analysis for Generalized Proportional Fair Frequency Scheduling in OFDMA", VTC 2005-Spring. 2005 IEEE 61st (Volume: 3)

NPL 2: M. Iwamura et al., "Carrier aggregation framework in 3GPP LTE-Advanced", IEEE, Communication Magazine, Vol. 48, No. 8, pp. 60-67, Aug. 2010.

NPL 3: Yuanye Wang et al., "Carrier Load Balancing and Packet Scheduling for Multi-Carrier Systems", IEEE Transactions Wireless Communications, Vol. 9, No. 4, April 2010

SUMMARY OF INVENTION

Technical Problem

However, general methods have a problem of not being able to improve fairness of the throughputs among mobile stations when CCs have different bandwidths or traffic loads. It is assumed below that allocation indices and average allocation bands (widths) have a proportional relationship.

For example, assume a case, as illustrated in FIG. 13, where one CC (CC1) has a bandwidth of 10 MHz while the other CC (CC2) has a bandwidth of 5 MHz the frequencies higher than those of CC1, as a system band. In this case, as illustrated in FIG. 14, when there are three mobile stations that can use only CC1 of two CCs controlled by a radio station and one mobile station that can simultaneously use the two CCs, the mobile station that can simultaneously use the two CCs solely uses the band of CC2. In this case, when a general method is employed, the allocation index of the mobile station that can simultaneously use the two CCs is the value obtained by multiplying, by 0.5, the allocation index obtained by the PF scheduler, consequently failing to set the allocation index at a sufficiently small value with respect to that for a mobile station that can use CC1 only. As a result, a wider band is allocated to the mobile station that can simultaneously use the two CCs than that for a mobile station that can use CC1 only. Therefore, fairness of the throughputs among the mobile stations is not improved.

Similarly, as illustrated in FIG. 16, when there are ten mobile stations that can simultaneously use the two CCs, which is five times more than the number of mobile stations that can use CC1 only, each mobile station that can simultaneously use the two CCs can use only a band of 0.5 MHz on average in the CC2 for radio communications. Since the band of CC1 is preferentially allocated to the mobile stations that can use only CC1 in the general method, a larger band is allocated to each mobile station that can use CC1 only as illustrated in FIG. 17, consequently failing to improve fairness of the throughputs among the mobile stations as in the preceding case.

The present application aims to solve the above-described problems and to improve fairness of throughputs among mobile stations even when CCs have different bandwidths or traffic loads.

Solution to Problem

The present invention is a frequency block allocation method for a radio communication system in which a radio station and mobile stations perform radio communication by using a frequency block selected from a plurality of system bands, the frequency block allocation method being characterized by including: an allocation number determination step of determining the number of system bands that can allocate to each mobile station; a communication band index calculation step of calculating a communication band index on the basis of bandwidths and loads of the system bands according to the determined allocation number; an allocation index calculation step of calculating an allocation index of each mobile station for each of the system bands by using the communication band index; and a frequency block allocation step of allocating frequency blocks to the mobile stations on the basis of the allocation indices.

The present invention is a radio communication system in which a radio station and mobile stations perform radio communication by using a frequency block selected from a plurality of system bands, the radio communication system being characterized by including: an allocation number determination means for determining number of system bands that can allocate to each mobile station; a communication band index calculation means for calculating a communication band index on the basis of bandwidths and loads of the system bands according to the determined allocation number; an allocation index calculation means for calculating an allocation index of each mobile station for each of the system bands by using the communication band index; and a frequency block allocation means for allocating frequency blocks to the mobile stations on the basis of the allocation indices.

The present invention is a frequency block allocation apparatus of a radio communication system in which a radio station and mobile stations perform radio communication by using a frequency block selected from a plurality of system bands, the allocation apparatus being characterized by including: an allocation number determination means for determining the number of system bands that can allocate to each mobile station; a communication band index calculation means for calculating a communication band index on the basis of bandwidths and loads of the system bands according to the determined allocation number; an allocation index calculation means for calculating an allocation index of each mobile station for each of the system bands by using the communication band index; and a frequency block allocation means for allocating frequency blocks to the mobile stations on the basis of the allocation indices.

The present invention is a program for a frequency block allocation apparatus of a radio communication system in which a radio station and mobile stations perform radio communication by using a frequency block selected from a plurality of system bands, the program being characterized by causing the allocation apparatus to execute: an allocation number determination process of determining the number of system bands that can allocate to each mobile station; a communication band index calculation process of calculating a communication band index on the basis of bandwidths and loads of the system bands according to the determined allocation number; an allocation index calculation process of calculating an allocation index of each mobile station for each of the system bands by using the communication band index; and a frequency block allocation process of allocating frequency blocks to the mobile stations on the basis of the allocation indices.

Advantageous Effects of Invention

According to the present invention, it is possible to improve fairness of the throughputs among mobile stations even when CCs have different bandwidths or traffic loads. This is because frequency blocks are allocated on the basis of allocation indices calculated by the use of the bandwidths and the traffic loads of the respective CCs so that allocated bandwidths are to be equal among the mobile stations

BRIEF DESCRIPTION OF DRAWINGS

FIG. 17 is a diagram illustrating a problem of the general technique.

DESCRIPTION OF EMBODIMENTS

First Exemplary Embodiment

Next, an exemplary embodiment of the present invention is described in detail with reference to the drawings.
[Description of Configuration]

Figure 1:
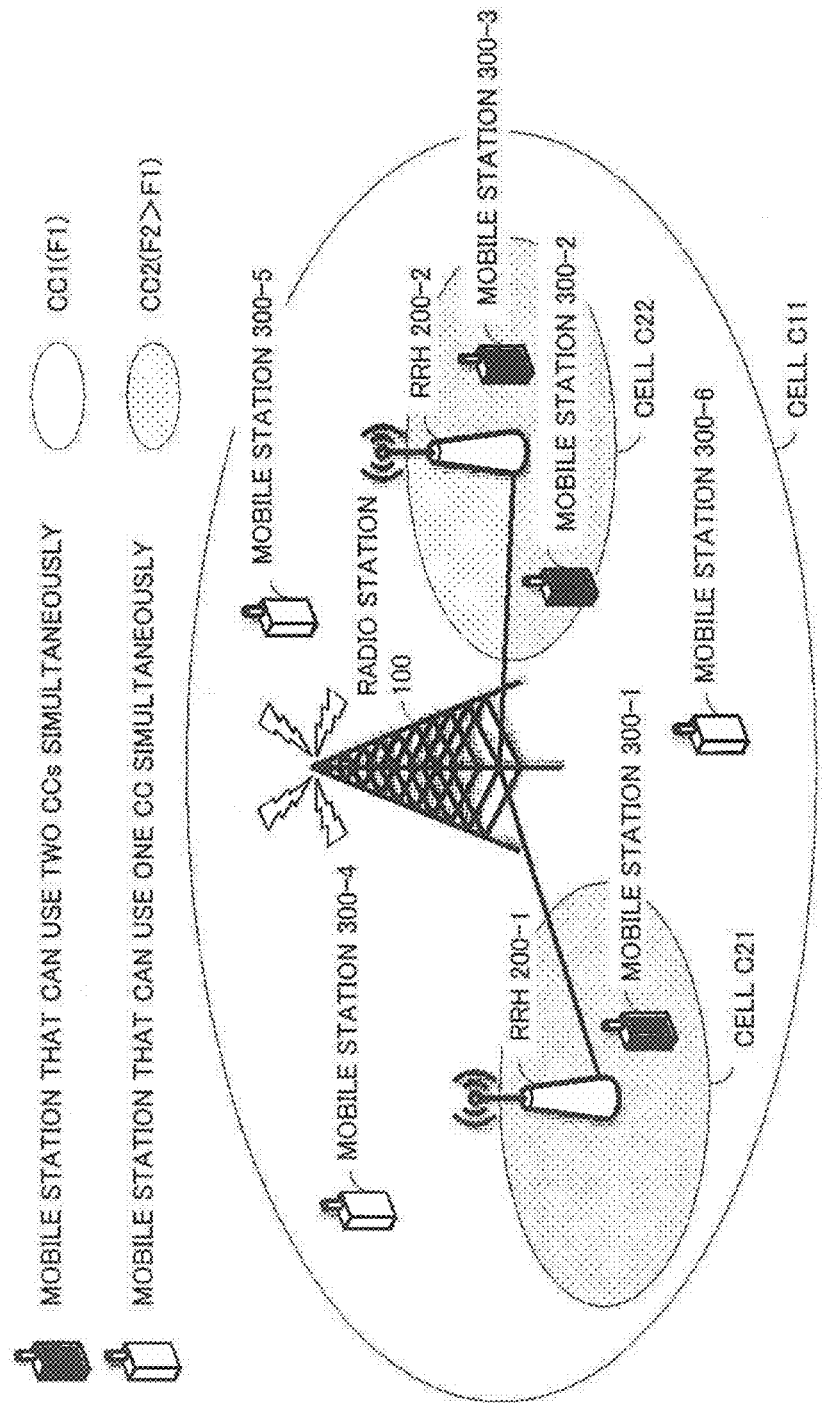
FIG. 1 is a diagram illustrating a configuration of a radio communication system in a first exemplary embodiment.

FIG. 1 illustrates a configuration of a radio communication system 10 according to the first exemplary embodiment of the present invention. The radio communication system 10 is configured by employing the present invention in LTE downlink. The radio communication system 10 includes a radio station 100 which forms a cell C11, an RRH 200-1 which forms a cell C21, an RRH 200-2 which forms a cell C12, and multiple mobile stations 300-1, 300-2, 300-3, 300-4, 300-5, and 300-6. For the purpose of illustration, the radio communication system 10 includes only a single radio station in this drawing. However, there may be any number of radio stations to be included; similarly, there may be any number of RRHs and mobile stations. In this drawing, the radio station 100 and each of the RRHs 200-1 and 200-2 have an omni-cell configuration, in which only a single cell (communication area) is formed, in the radio communication system 10. However, the radio station 100 and each of the RRHs 200-1 and 200-2 may have a sector cell configuration, in which multiple cells are formed by using directional antennas.

In the following description, a phrase as "each RRH 200 is" is used to explain a respect common to the RRHs.

Similarly, a phrase as "each mobile station 300 is" is used to explain a respect common to the mobile stations.

The radio communication system 10 includes, as system bands (system carriers), a CC1 having frequencies of F1 and a bandwidth of BW1 and a CC2 having frequencies of F2 and a bandwidth of BW2. In the present exemplary embodiment, description is given of an example in which the radio station 100 transmits and receives radio signals using the CC1 whereas each RRH 200 transmits and receives radio signals using the CC2. Although all the multiple mobile stations can perform CA, it is assumed, in the present exemplary embodiment, that the mobile stations 300-1, 300-2, and 300-3 can use both the CC1 and the CC2 and the mobile stations 300-4, 300-5, and 300-6 can use the CC1. The mobile station 300-1 can use the CC2 of the RRH 200-1, and the mobile stations 300-2 and 300-3 can use the CC2 of the RRH 200-2.

The radio station 100 performs radio communications with the mobile stations 300 located in the communication area controlled by the radio station 100, by using the CC1. Moreover, the radio station 100 is connected directly with each RRH 200, manages the radio communications by the RRH 200, and performs radio communications with the mobile stations 300 located in the communication area formed by the RRH 200, by using the CC2 via the RRH 200. Although not illustrated in the drawing, the radio station 100 is connected to a communication network NW and receives transmission data to each mobile station 300 via the communication network NW.

The radio station 100 includes an unillustrated information processing device. The information processing device includes an unillustrated central processing unit (CPU) and a storage device (a memory and a hard disk drive (HDD)). The radio station 100 is configured to implement the functions to be described later, by the CPU executing a program stored in the storage device.

Each RRH 200 transmits and receives radio signals to and from each mobile station 300 located in the communication area formed by the RRH 200, by using the CC2. The communication areas of the RRHs 200 are usually determined on the basis of the reception levels of the mobile stations 300 but may also be determined by taking the traffic loads into account.

Each mobile station 300 is a device such as a mobile-phone unit, a personal computer, a personal handyphone system (PHS) terminal, a personal data assistance/personal digital assistant (PDA), a smartphone, a tablet terminal, a car navigation terminal, or a gaming terminal. Each mobile station 300 includes a CPU, a storage device (memory), input devices (a key button and a microphone), and output devices (a display and a speaker). Each mobile station 300 is configured to implement the functions of the mobile station 300 by the CPU executing a program stored in the storage device. The functions of the mobile station 300 are known to those skilled in the art, and therefore, description thereof is omitted.

Figure 2:
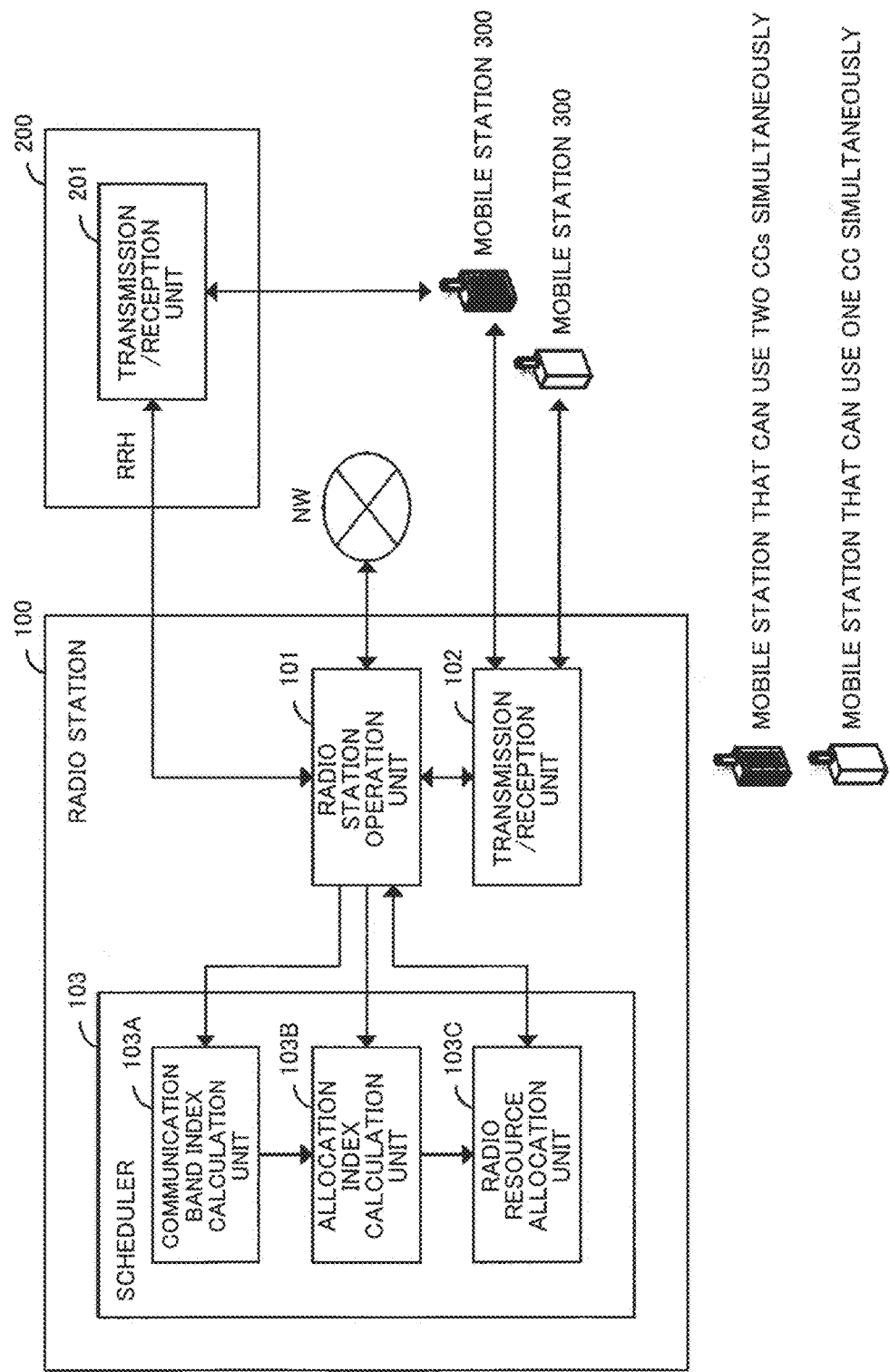
FIG. 2 is a diagram illustrating configurations of a radio station and an RRH in the first exemplary embodiment.

FIG. 2 is a block diagram illustrating functions of the radio station 100 and functions of each RRH 200 in the radio communication system 10 configured as described above.

The radio station 100 includes a radio station operation unit 101, a transmission/reception unit 102, and a scheduler 103. The radio station operation unit 101 has general functions of a base station other than a transmission/reception function, such as: the function of managing information on the frequencies and bandwidths of the CCs used in the communication area of the radio station 100 and the communication areas of the RRHs 200 controlled by the radio station 100; the function of managing information on the number of the mobile stations 300 currently connected to each of the communication areas, the function of generating radio signals to be transmitted to the mobile stations 300; and the function of managing radio signals transmitted by each mobile station 300 and received by the transmission/reception unit 102 and transmission/reception units 201 of the RRHs 200 to be described later. The configuration and operation of the radio station operation unit 101 are known to those skilled in the art, and therefore, description thereof is omitted.

The transmission/reception unit 102 has: the function of transmitting radio signals generated by the radio station operation unit 101 to the mobile stations 300 located in the communication area controlled by the radio station 100, by using the CC1; and the function of receiving radio signals transmitted by the mobile stations 300. The configuration and operation of the transmission/reception unit 102 are known to those skilled in the art, and therefore, description thereof is omitted. Although the functions of the transmission/reception unit 102 are usually included in the radio station operation unit 101, description is given separately of the radio station operation unit 101 and the transmission/reception unit 102 in the present exemplary embodiment since radio signals are transmitted and received by a transmission/reception unit 201 to be described later in the communication area formed by each RRH 200.

The scheduler 103 includes a communication band index calculation unit 103A, an allocation index calculation unit 103B, and a radio resource allocation unit 103C.

The communication band index calculation unit 103A has the function of calculating a communication band index for each mobile station 300 by the use of the bandwidths and traffic loads of the CCs. In the present exemplary embodiment, a traffic load corresponds to the number of connected mobile stations 300 and is managed by the radio station operation unit 101. The calculated communication band indices are used by the allocation index calculation unit 103B.

The allocation index calculation unit 103B has the function of calculating an allocation index for each mobile station 300 by the use of the corresponding communication band index calculated by the communication band index calculation unit 103A. The calculated allocation indices are used by the radio resource allocation unit 103C.

The radio resource allocation unit 103C has the function of storing transmission data to the mobile stations 300 received via the communication network NW and information to be used for transmitting the transmission data. In addition, the radio resource allocation unit 103C has the function of determining frequency blocks to be allocated to the mobile stations 300, on the basis of the allocation indices calculated by the allocation index calculation unit 103B. In the present exemplary embodiment, a frequency block is denoted by RB, and an RB is allocated to the mobile station 300 having the largest allocation index of those calculated by the allocation index calculation unit 103B.

Each RRH 200 includes the transmission/reception unit 201. The transmission/reception unit 201 has: the function of transmitting radio signals generated by the radio station operation unit 101 of the radio station 100, to the mobile stations 300 located in the communication area formed by the RRH 200; and the function of receiving radio signals transmitted by the mobile stations 300. The configuration and operation of the transmission/reception unit 201 are known to those skilled in the art, and therefore, description thereof is omitted.

[Description of Operation]

Next, description is given of an operation procedure in which the above-described radio station 100 allocates frequency blocks on the basis of allocation indices calculated by the use of the bandwidths and traffic loads of the CCs used by the mobile stations.

Figure 3:
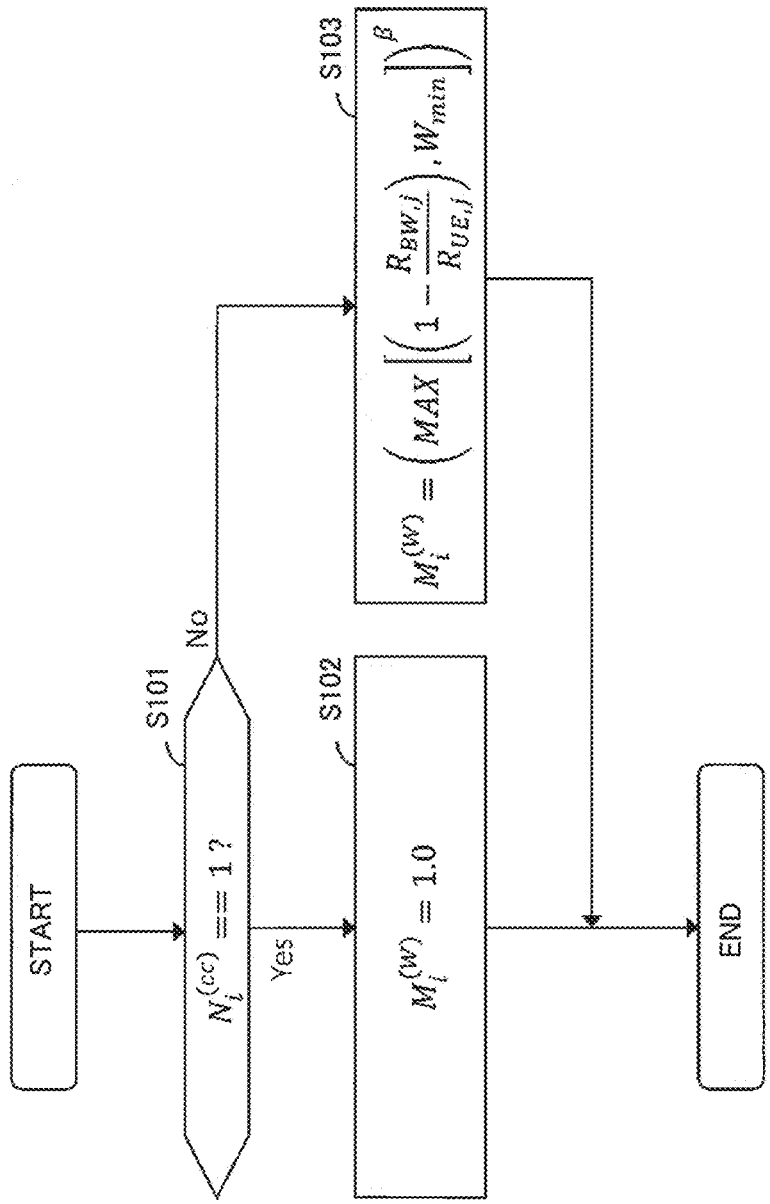
FIG. 3 is a flowchart presenting a method of calculating a communication band index in the first exemplary embodiment.

FIG. 3 illustrates an operation procedure in which the scheduler 103 of the radio station 100 calculates, for each mobile station 300, a communication band index indicating an expected value of a band to be allocated, the value being expected for the mobile station 300. The radio station 100 performs the operations in FIG. 3 for each subframe. A subframe is a unit of time for radio resource allocation.

First, the scheduler 103 determines, for each mobile station 300, whether the number of CCs that can be used simultaneously by the mobile station 300 is one, on the basis of setting information on the CCs that the mobile station uses, the information being preset in the system, according to Equation (5) (Step S101). In Equation (5), i denotes the identification number of the mobile station 300, and $N^{(CC)}$ denotes the number of CCs that can be used simultaneously.

[Math. 5]

$$N_i^{(CC)} = 1? \qquad \text{Equation (5)}$$

When Equation (5) is true (Yes in Step S102), the scheduler 103 calculates a communication band index $M_i^{(W)}$ of the mobile station 300 according to Equation (6) (Step S102).

[Math. 6]

$$M_i^{(W)} = 1.0 \qquad \text{Equation (6)}$$

In contrast, when Equation (5) is not true (No in Step S102), the scheduler 103 calculates the communication band index $M^{(W)}$ of the mobile station 300 according to Equation (7) (Step S103). In Equation (7), j denotes the identification number of the RRH 200 connected to the radio station 100. $R_{BW}$ is calculated according to Equation (8), and $R_{UE}$ is calculated according to Equation (9).

[Math. 7]

$$M_i^{(W)} = \left\{ \text{MAX}\left[\left(1 - \frac{R_{BW,j}}{R_{UE,j}}\right), W_{min}\right]\right\}^\beta \qquad \text{Equation (7)}$$

[Math. 8]

$$R_{BW,j} = \frac{N_{RB}^{F2}}{N_{RB}^{F1} + N_{RRH} \cdot N_{RB}^{F2}} \qquad \text{Equation (8)}$$

$N_{RB}^{F1}$ denotes the number of RBs that can be allocated in the communication area of the radio station 100

$N_{RB}^{F2}$ denotes the number of RBs that can be allocated in the communication area of the RRH 200

$N_{RRM}$ denotes the number of RRHs 200 connected to the radio station 100

[Math. 9]

$$R_{UE,j} = \frac{N_{UE,j}^{RRH}}{N_{UE}^{RRH} + \sum_{j=1}^{N_{RRH}}(N_{UE,j}^{RRH})} \qquad \text{Equation (9)}$$

$N_{UE,j}^{RRH}$ denotes the number of the mobile stations 300 located in the communication area of the RRH 200 having the identification number j $N_{UE}^{RRH}$ denotes the number of the mobile stations 300 located in the communication area obtained by excluding the communication area of the RRHs 200 connected to the radio station 100 from the communication area of the radio station 100

Equations (6) and (7) are derived, by assuming that the average numbers of allocated RBs are in proportion to the allocation indices, on the basis of the average number of allocated RBs among the mobile stations 300 in the communication area of the radio station 100 when the average numbers of allocated RBs are the same among all the mobile stations 300. A derivation process for each of Equations (6) and (7) is described below.

Assume that $x_j$ denotes the average number of allocated RBs among the mobile station 300 located in the communication area of the RRH 200 having the identification number of j, in the communication area of the radio station 100, and that y denotes the average number of allocated RBs among the mobile stations 300 located in the communication area obtained by excluding the communication areas of the respective RRHs 200 connected to the radio station 100, in the communication area of the radio station 100. In this case, on the assumption that all the allocatable RBs in the communication area of the radio station 100 are allocated to the mobile stations 300 located in the communication area of the radio station 100, Equation (10) is established. In addition, on the assumption that the average numbers of allocated RBs among all the mobile stations 300 are the same, Equation (11) is established.

[Math. 10]

$$\sum_{j=1}^{N_{RRH}}(x_j \cdot N_{UE,j}^{RRH}) + y \cdot N_{UE}^{RRH} = N_{RB}^{F1} \qquad \text{Equation (10)}$$

[Math. 11]

$$y = x_1 + \frac{N_{RB}^{F2}}{N_{UE,1}^{RRH}} = x_2 + \frac{N_{RB}^{F2}}{N_{UE,2}^{RRH}} = \cdots = x_{N_{RRH}} + \frac{N_{RB}^{F2}}{N_{UE,N_{RRH}}^{RRH}} \qquad \text{Equation (11)}$$

On the assumption that the average numbers of allocated RBs are in proportion to the allocation indices, the communication band index $M^{(W)}$ of each mobile station 300 is calculated as in Equation (12).

[Math. 12]

$$M_i^{(W)} = \begin{cases} \dfrac{x_j}{y} = 1 - \dfrac{\dfrac{N_{RB}^{F2}}{N_{RB}^{F1} + N_{RRH} \cdot N_{RB}^{F2}}}{\dfrac{N_{UE,j}^{RRH}}{N_{UE}^{RRH} + \sum_{j=1}^{N_{RRH}} (N_{UE,j}^{RRH})}} = 1 - \dfrac{R_{BW}}{R_{UE}} & \text{(located in the communcation area of the RRH 200 having the identification number } j\text{)} \\ = \dfrac{y}{y} = 1 & \text{(located outside the communication area of the RRHs 200)} \end{cases}$$

Equation (12)

When Equation (12) is used, in some cases, the communication band index of each of the mobile stations 300 located in the communication area of the RRH 200 having the identification number j results in a negative value. In view of this, by the use of a minimum value $W_{min}$ (≥0) of the communication band index $M^{(W)}$, the communication band index $M^{(W)}$ is set at the minimum value $W_{min}$ when the value obtained by the calculation according to Equation (12) is smaller than the minimum value $W_{min}$. When a parameter β is introduced in order to adjust the difference in throughput among the mobile stations, Equations (6) and (7) are derived.

Figure 4:
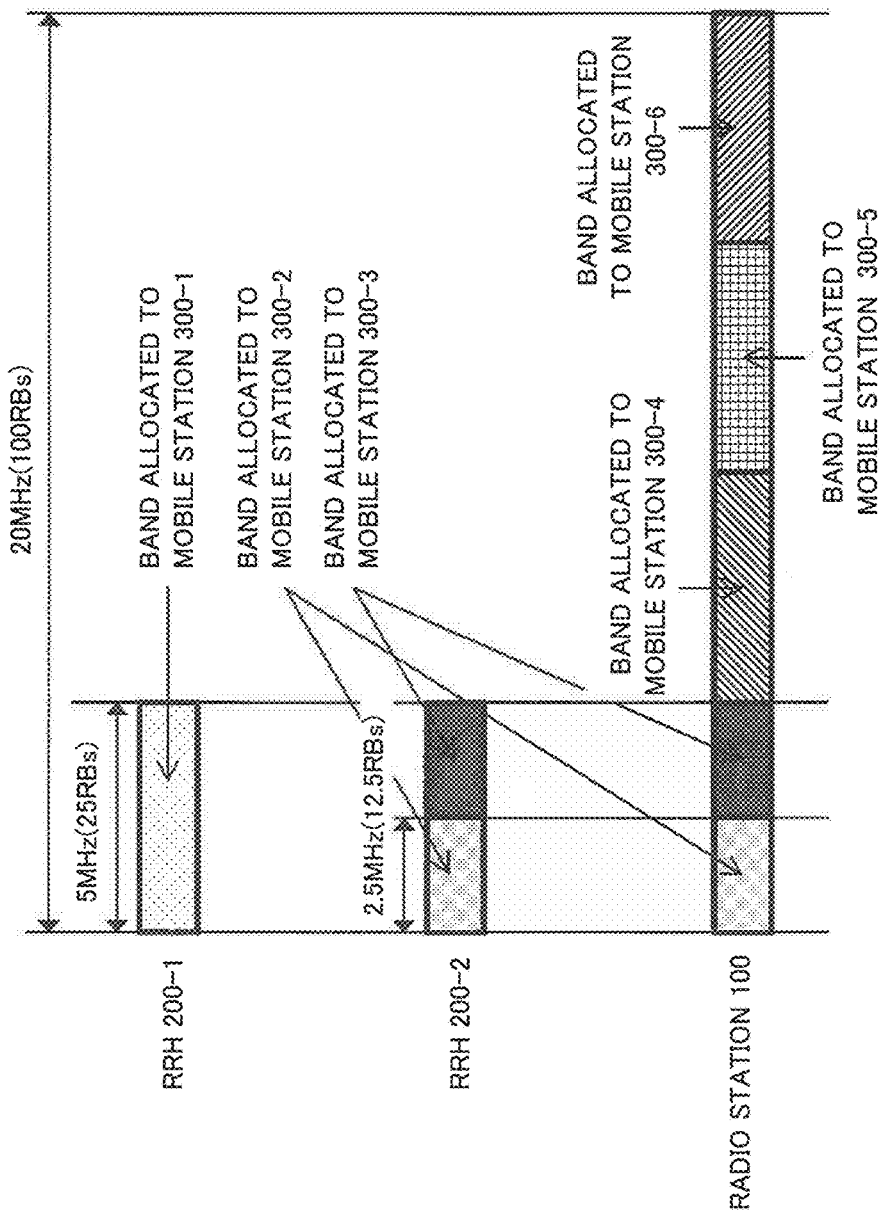
FIG. 4 is a diagram illustrating allocation of bands allocated to respective mobile stations in the first exemplary embodiment.

Herein, to check that the communication band index $M^{(W)}$ calculated according to each of Equations (6) and (7) has a proportional relationship with the average number of allocated RBs, assumed is a case where the CC1 has a bandwidth BW1 of 20 MHz (the number of RBs is 100) and the CC2 has a bandwidth BW2 of 5 MHz (the number of RBs is 25) in the radio communication system 10 in FIG. 1 as in FIG. 4, for example. When the communication band index $M^{(W)}$ of each mobile station 300 is calculated by assuming that the minimum value $W_{min}$ is zero and the parameter β is set at one, the index is zero for the mobile station 300-1, ½ for the mobile stations 300-2 and 300-3, and one for the mobile stations 300-4, 300-5, and 300-6 as presented in Equation (13).

[Math. 13]

$$M_i^{(W)} = \begin{cases} = \text{MAX}\left[1 - \dfrac{25/(100 + 2 \cdot 25)}{1/(3 + 1 + 2)}, 0\right] = 0 & \text{(Mobile station 300-1)} \\ = \text{MAX}\left[1 - \dfrac{25/(100 + 2 \cdot 25)}{2/(3 + 1 + 2)}, 0\right] = \dfrac{1}{2} & \text{(Mobile station 300-2, mobile station 300-3)} \\ = 1 & \text{(Mobile station 300-4 to mobile station 300-6)} \end{cases}$$

Equation (13)

When the average numbers of allocated RBs are the same among all the mobile stations 300, the average number of allocated RBs among the mobile stations 300 is 25. In this case, the average number of allocated RBs of each mobile station 300 in the CC1 is zero for the mobile station 300-1, 25 for each of the mobile stations 300-2 and 300-3, and 50 for each of the mobile stations 300-4, 300-5, and 400-6, and therefore, the average numbers of allocated RBs have a proportional relationship with the communication band indices $M^{(W)}$.

The scheduler 103 carries out the above-described process for all the mobile stations 300 located in the communication area of the radio station 100. The scheduler 103 then terminates the process in FIG. 3.

Figure 5:
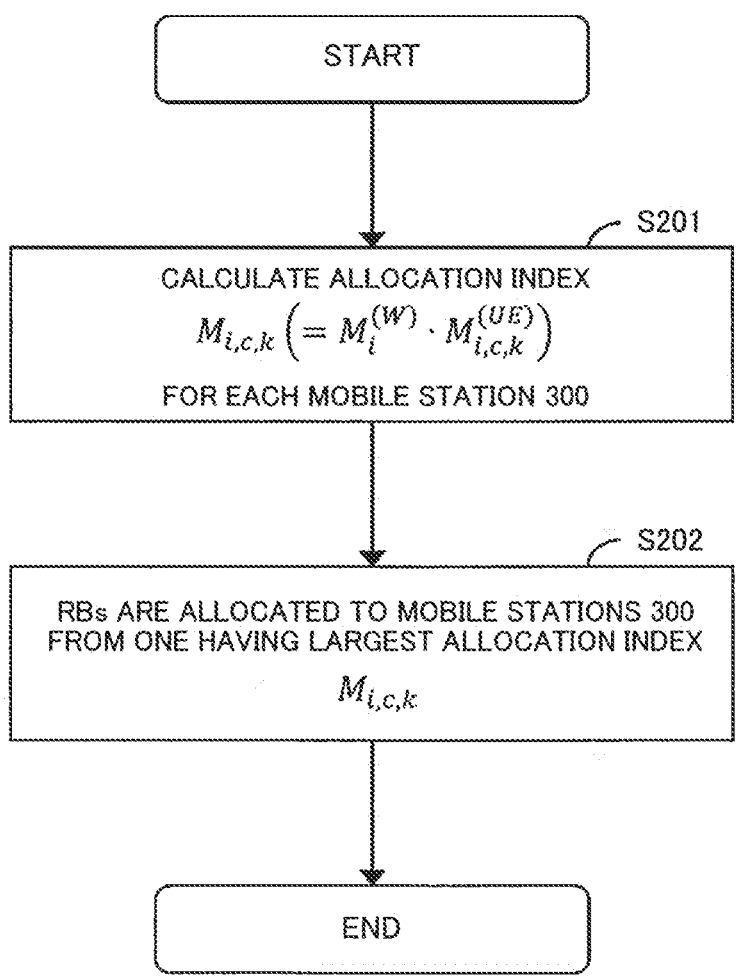
FIG. 5 is a flowchart presenting a method of allocating frequency blocks in the first exemplary embodiment.

FIG. 5 is a flowchart presenting an operation procedure in which the scheduler 103 of the radio station 100 determines RBs to be allocated to each mobile station 300. The scheduler 103 carries out the process presented in FIG. 5 upon completion of the process in FIG. 3.

First, the scheduler 103 calculates the allocation index M for each mobile station 300 according to Equation (14) (Step S201). In Equation (14), c denotes the identification number of a CC, k denotes the identification number of an RB, $M^{(UE)}$ denotes an index calculated individually for the mobile station. In the present exemplary embodiment, $M^{(UE)}$ corresponds to the allocation index $M^{(PF)}$ calculated by the improved PF scheduler described in Background Art above.

[Math. 14]

$$M_{i,c,k} = M_i^{(W)} \cdot M_{i,c,k}^{(UE)}$$

Equation (14)

The scheduler 103 then allocates the RBs of the communication areas to the mobile stations 300 sequentially from the one having the largest allocation index M (Step S202). After the operation, the scheduler 103 terminates the process in FIG. 5.

As described above, according to the first exemplary embodiment of the present invention, fairness of the throughputs among the mobile stations can be improved even when the mobile stations 300 having different numbers of CCs that can be used simultaneously are included while the bandwidths and traffic loads are different between the CCs. This is possible because the allocation index of each mobile station 300 is calculated so that the mobile stations 300 are to have the same average number of allocated RBs irrespective of the number of CCs that can be used simultaneously.

The invention of the present application is described above with reference to the above-described exemplary embodiment. However, the invention of the present application is not limited to the above-described exemplary embodiment. Various changes understood by those skilled in the art may be made to the configuration and details of the invention of the present application within the scope of the invention of the present application.

For example, in the present exemplary embodiment, each allocation index is assumed to be the value obtained by multiplying the corresponding communication band index and the index calculated individually for the corresponding mobile station. However, each allocation index may be a value obtained by adding the corresponding communication band index and the index calculated individually for the corresponding mobile station. The index calculated individually for the mobile station may be an allocation index calculated by the PF scheduler described in Background Art above. Alternatively, the index may be a value obtained by further multiplying the value by an index according to service, such as quality of service (QoS) class identifier (QCI) or may be a value obtained by multiplying the value by an index based on QoS such as delay time.

In the present exemplary embodiment, each traffic load is assumed to be the number of mobile stations 300 connected to the corresponding CC. However, each traffic load may be the traffic amount of the corresponding CC.

In the present exemplary embodiment, the number of CCs included in the radio communication system 10 is assumed to be two. However, application is possible even when the number of CCs is three or more. In this case, each communication band index is calculated by using the effective bandwidth of the communication area of the radio station 100 and the effective bandwidths of the communication areas of the RRHs 200. The effective bandwidth of the communication area of the radio station 100 is the total of the numbers of the RBs that can be allocated to the CCs used for radio communications from the radio station 100. The effective bandwidth of the communication area of each RRH 200 is the sum total of the numbers of the RBs that can be allocated in the CCs used for radio communications from the RRHs 200. For example, assume that a CC3 having $$N_{RB}^{F3}$$

as the number of RBs that can be allocated is added to the RRHs 200. In this case, the difference in throughput between the mobile stations located in the communication areas of the RRHs 200 and the mobile stations located outside the communication areas of the RRHs 200 becomes larger than that in the case where the number of CCs included in the radio communication system 10 is two. In this case, the communication band index $M^{(W)}$ of each mobile station 300 is calculated as in Equation (15). Therefore, it is possible to make the communication band index of each mobile station located in the communication area of any of the RRHs 200 even smaller than that obtained according to Equation (12).

[Math. 15]

$$M_i^{(W)} \begin{cases} = \dfrac{x_j}{y} = 1 - \dfrac{\dfrac{N_{RB}^{F2} + N_{RB}^{F3}}{N_{RB}^{F1} + N_{RRH} \cdot (N_{RB}^{F2} + N_{RB}^{F3})}}{N_{UE}^{RRH} + \sum_{j=1}^{N_{RRH}} (N_{UE,j}^{RRH})} & \text{(located in the communcation area of the } RRH\ 200 \text{ having the identification number } j\text{)} \\[2ex] = \dfrac{y}{y} = 1 & \text{(located outside the communication areas of the } RRHs\ 200\text{)} \end{cases} \quad \text{Equation (15)}$$

Meanwhile, assume that the CC3 is added to the radio station 100, as a case where the number of CCs is three or more. In this case, the difference in throughput among the mobile station becomes smaller than that in the case where the number of CCs included in the radio communication system 10 is two. In this case, the communication band index $M^{(W)}$ of each mobile station 300 is calculated as in Equation (16). Therefore, it is possible to make the communication band index of each mobile station located in the communication area of any of the RRHs 200 closer to one than that according to Equation (12).

[Math. 16]

$$M_i^{(W)} \begin{cases} = \dfrac{x_j}{y} = 1 - \dfrac{\dfrac{N_{RB}^{F2}}{(N_{RB}^{F1} + N_{RB}^{F3}) + N_{RRH} \cdot N_{RB}^{F2}}}{N_{UE}^{RRH} + \sum_{j=1}^{N_{RRH}} (N_{UE,j}^{RRH})} & \text{(located in the communcation area of the } RRH\ 200 \text{ having the identification number } j\text{)} \\[2ex] = \dfrac{y}{y} = 1 & \text{(located outside the communication areas of the } RRHs\ 200\text{)} \end{cases} \quad \text{Equation (16)}$$

As described above, it is possible, even when the number of the CCs included in the radio communication system is three or more, to reduce the difference in throughput among the mobile stations, consequently being able to increase the smallest throughput of the mobile stations in the radio communication system.

In the present exemplary embodiment, all the mobile stations 300 can employ CA. However, application is possible even when mobile stations not capable of employing CA are included or even when mobile stations capable of employing CA while not being able to use the frequencies of the CCs included in the radio communication system 10 are included. Specifically, an allocation index is calculated for a mobile station not being capable of employing CA or a mobile station not being able to use the frequencies of the CCs included in the radio communication system 10, by assuming that the number of CCs possible for the mobile station to simultaneously use is one. The above changes may be made similarly to any of the following exemplary embodiments.

Second Exemplary Embodiment

Next, a second exemplary embodiment of the present invention is described in detail with reference to the drawings. In the first exemplary embodiment, a radio station controls each communication area. The present exemplary embodiment is different from the first exemplary embodiment in that a centralized controller controls each communication area.

[Description of Configuration]

Figure 6:
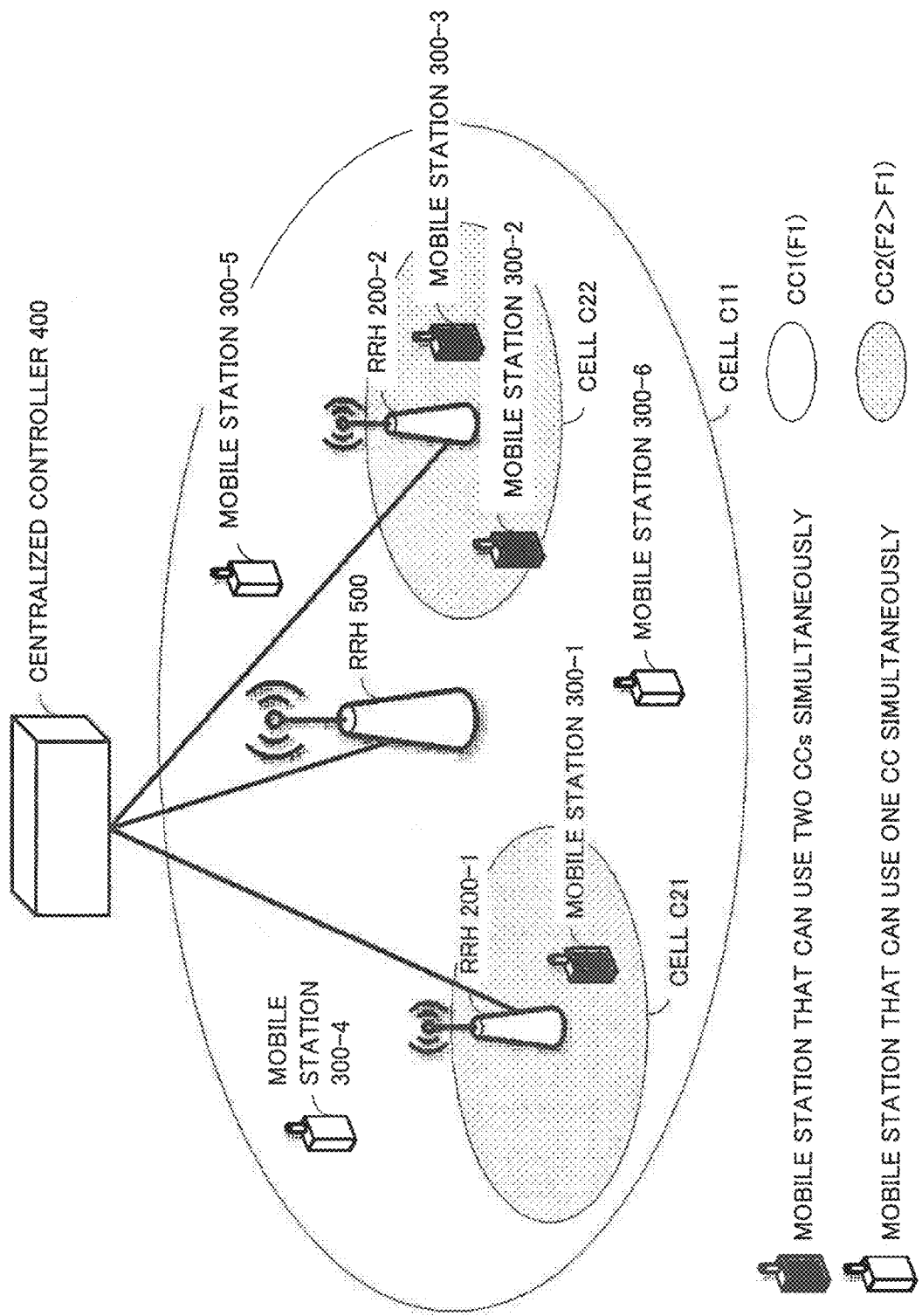
FIG. 6 is a diagram illustrating a configuration of a radio communication system in a second exemplary embodiment.

FIG. 6 illustrates a configuration of a radio communication system 20 according to the second exemplary embodiment of the present invention. The radio communication system 20 additionally includes a centralized controller 400 in comparison with the radio communication system 10 according to the first exemplary embodiment of the present invention. In addition to this, in the radio communication system 20, an RRH 500 forms the cell C11 instead of the radio station 100, in comparison with the radio communication system 10 according to the first exemplary embodiment of the present invention. Description is given below of the parts of the configuration that are changed in the second exemplary embodiment in comparison with the first exemplary embodiment.

The centralized controller 400 is connected directly with the RRH 500 and is configured to control radio communications by the RRH 500 to perform, by using the CC1, radio communications with the mobile stations 300 located in the communication area formed by the RRH 500. In addition to this, the centralized controller 400 is connected directly to each RRH 200 and is configured to control radio communications by the RRH 200 to perform, by using CC2, radio communications with the mobile stations 300 located in the communication area formed by the RRH 200, via the RRH 200.

The centralized control apparatus 400 includes an unillustrated information processing device. The information processing device includes a CPU and a storage device, which are not illustrated. The centralized control apparatus 400 is configured to implement the functions to be described later, by the CPU executing a program stored in the storage device.

The RRH 500 includes a transmission/reception unit capable of transmission with higher output than that of each RRH 200 and is configured to transmit and receive, by using the CC1, radio signals to and from the mobile stations located in the communication area formed by the RRH 500.

Figure 7:
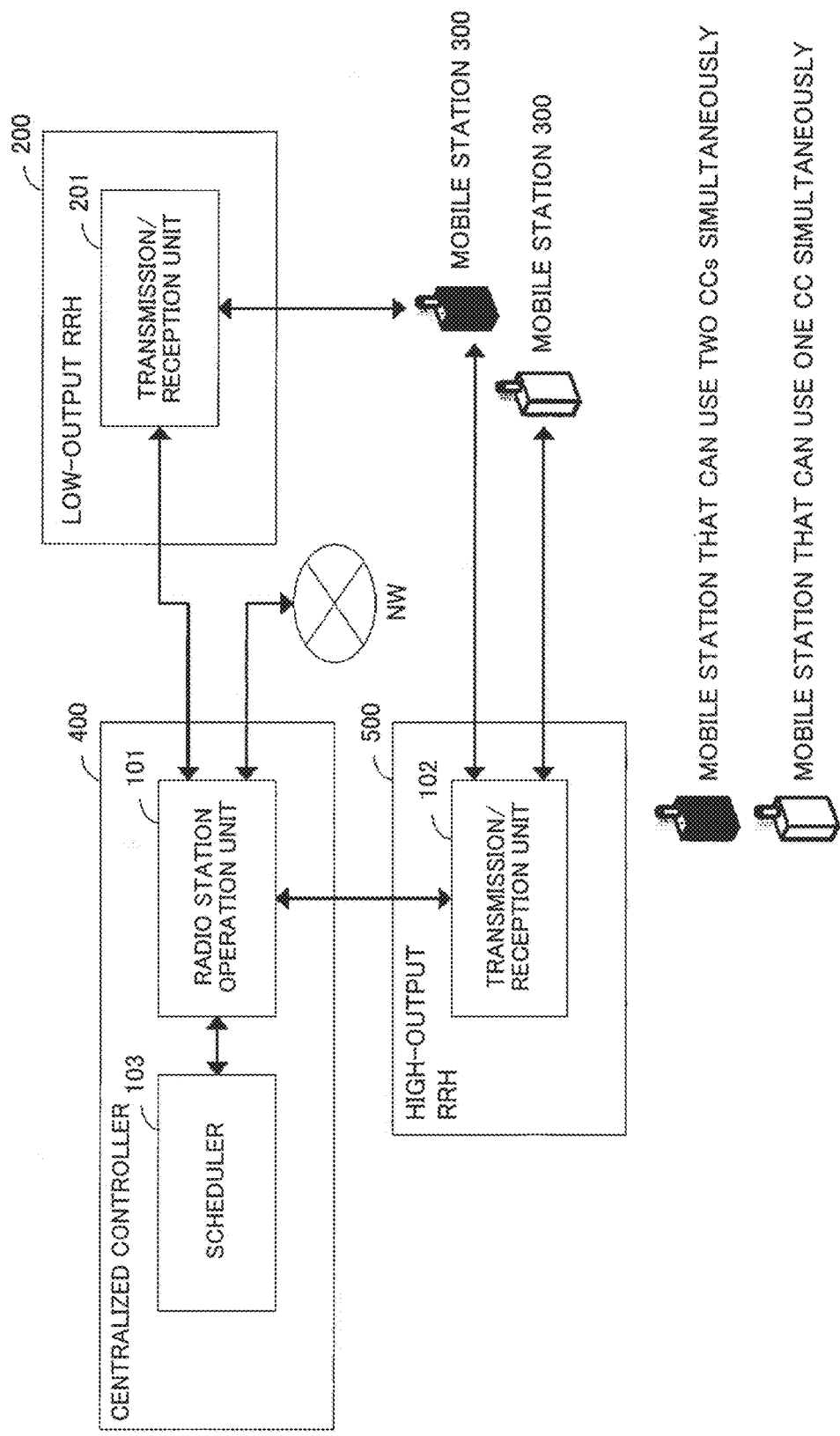
FIG. 7 is a diagram illustrating a configuration of a small cell GW and an RRH in the second exemplary embodiment.

FIG. 7 is a block diagram illustrating functions of the centralized controller 400, a function of each RRH 200, and a function of the RRH 500 in the radio communication system 20 having the above-described configuration. In comparison with the radio communication system 10 according to the first exemplary embodiment of the present invention, the same configuration as the first exemplary embodiment are employed, except that the centralized controller 400 includes the radio station operation unit 101 and the scheduler 103 of the functions of the radio station 100, and the RRH 500 includes the transmission/reception unit 102.

[Description of Operation]

The operation procedure for calculating a communication band index of each mobile station 300 and the operation procedure for determining RBs to be allocated to each mobile station 300 are the same as those in the first exemplary embodiment, and therefore, description thereof is omitted.

Third Exemplary Embodiment

Next, a third exemplary embodiment of the present invention is described in detail with reference to the drawings. In the first exemplary embodiment, frequency blocks are allocated on the basis of allocation indices calculated by the use of the bandwidths and traffic loads of the CCs so that the allocation bandwidths are to be equal among the mobile stations. However, when the communication capacities of the CCs are different, there is a possibility that the difference in throughput among the mobile stations is not reduced even with allocated bandwidths being equal. In view of this, in the present exemplary embodiment, frequency blocks are allocated on the basis of allocation indices calculated in consideration of the difference in communication capacity between CCs in addition to the bandwidths and traffic loads of the CCs.

[Description of Configuration]

Figure 8:
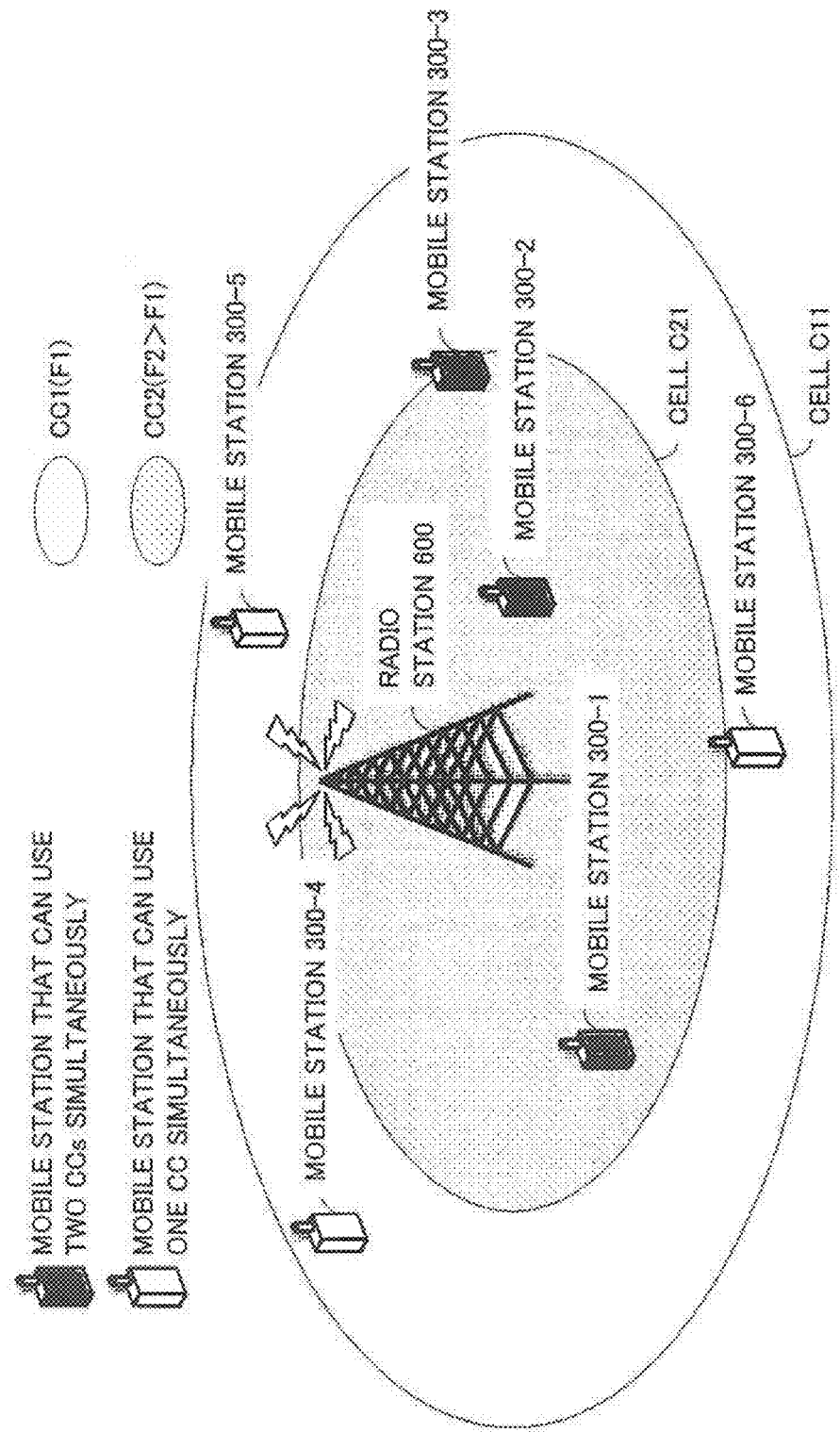
FIG. 8 is a diagram illustrating a configuration of a radio communication system in a third exemplary embodiment.

FIG. 8 illustrates a configuration of a radio communication system 30 according to the third exemplary embodiment of the present invention. In the radio communication system 30, the RRHs 200 are omitted in comparison with the radio communication system 10 according to the first exemplary embodiment of the present invention. In the radio communication system 20, a radio station 500 forms two communication areas (a cell 11 and a cell 21) in comparison with the radio communication system 10 according to the first exemplary embodiment of the present invention.

Figure 9:
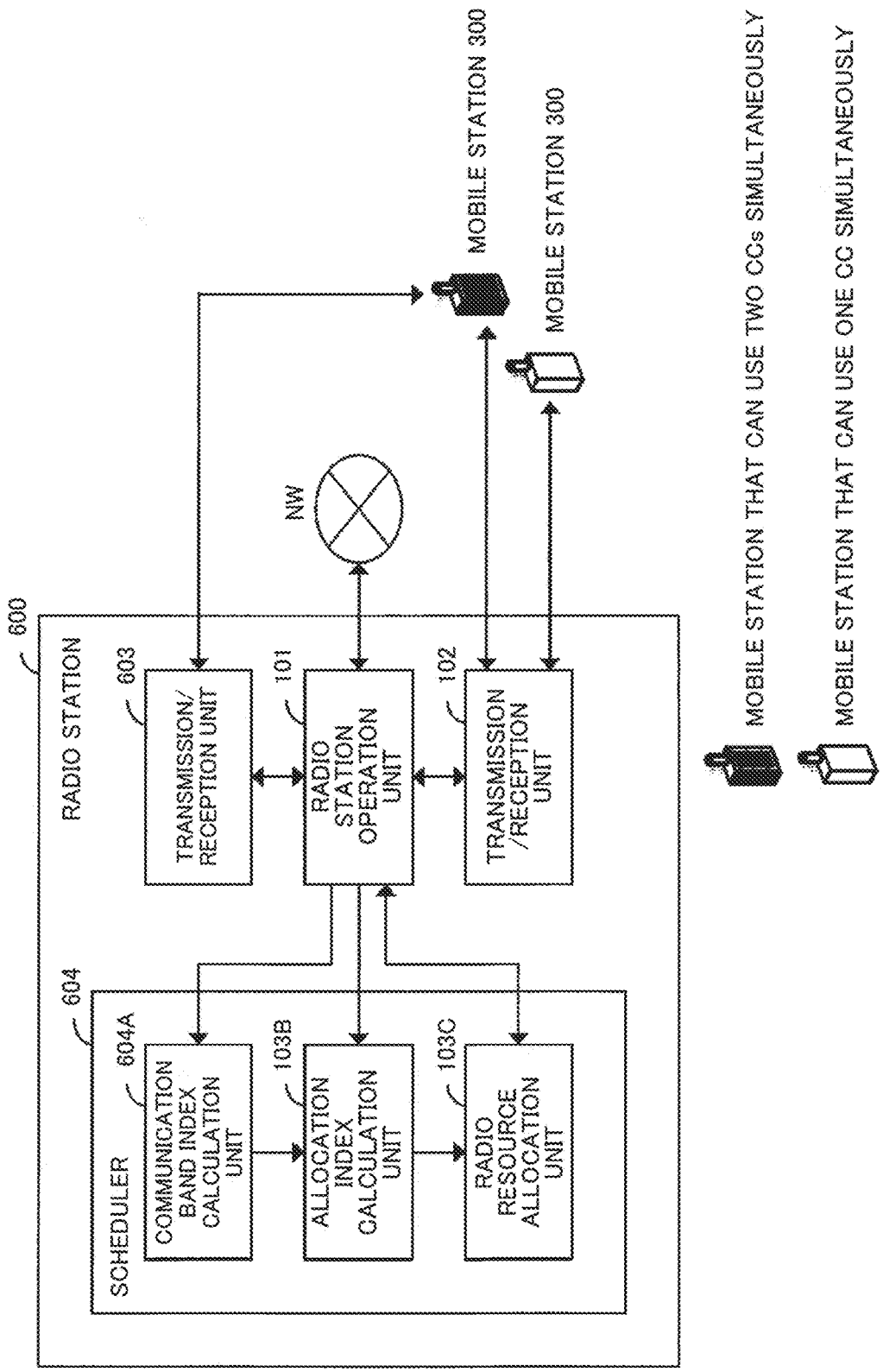
FIG. 9 is a diagram illustrating a configuration of a radio station in the third exemplary embodiment.

FIG. 9 is a block diagram illustrating functions of the radio station 600 in the radio communication system 30 configured as described above.

The radio station 600 additionally includes a transmission/reception unit 603 in comparison with the radio station 500 in the first exemplary embodiment. The radio station 600 includes a scheduler 604 instead of the scheduler 103 in comparison with the radio station 500 in the first exemplary embodiment. Description is given below of the transmission/reception unit 603 and the scheduler 604.

The transmission/reception unit 603 has: the function of transmitting, by using the CC2, radio signals generated by the radio station operation unit 101 to the mobile stations 300 located in the cell C21; and the function of receiving radio signals transmitted by the mobile stations 300. The configuration and operation of the transmission/reception unit 603 are known to those skilled in the art, and therefore, description thereof is omitted.

The scheduler 604 includes a communication band index calculation unit 604A, an allocation index calculation unit 103B, and a radio resource allocation unit 103C. Description is given below of the communication band index calculation unit 604A.

The communication band index calculation unit 604A has the function of calculating a communication band index for each mobile station 300 on the basis of the communication capacities of the CCs in addition to the bandwidths and traffic loads of the CCs. In the present exemplary embodiment, each traffic load corresponds to the number of corresponding connected mobile stations 300 and is managed by the radio station operation unit 101. The calculated communication band indices are used by the allocation index calculation unit 103B.

[Description of Operation]

Next, description is given of an operation procedure in which the above-described radio station 600 allocates frequency blocks by the use of allocation indices calculated on the basis of the bandwidths and traffic loads of the CCs.

Figure 10:
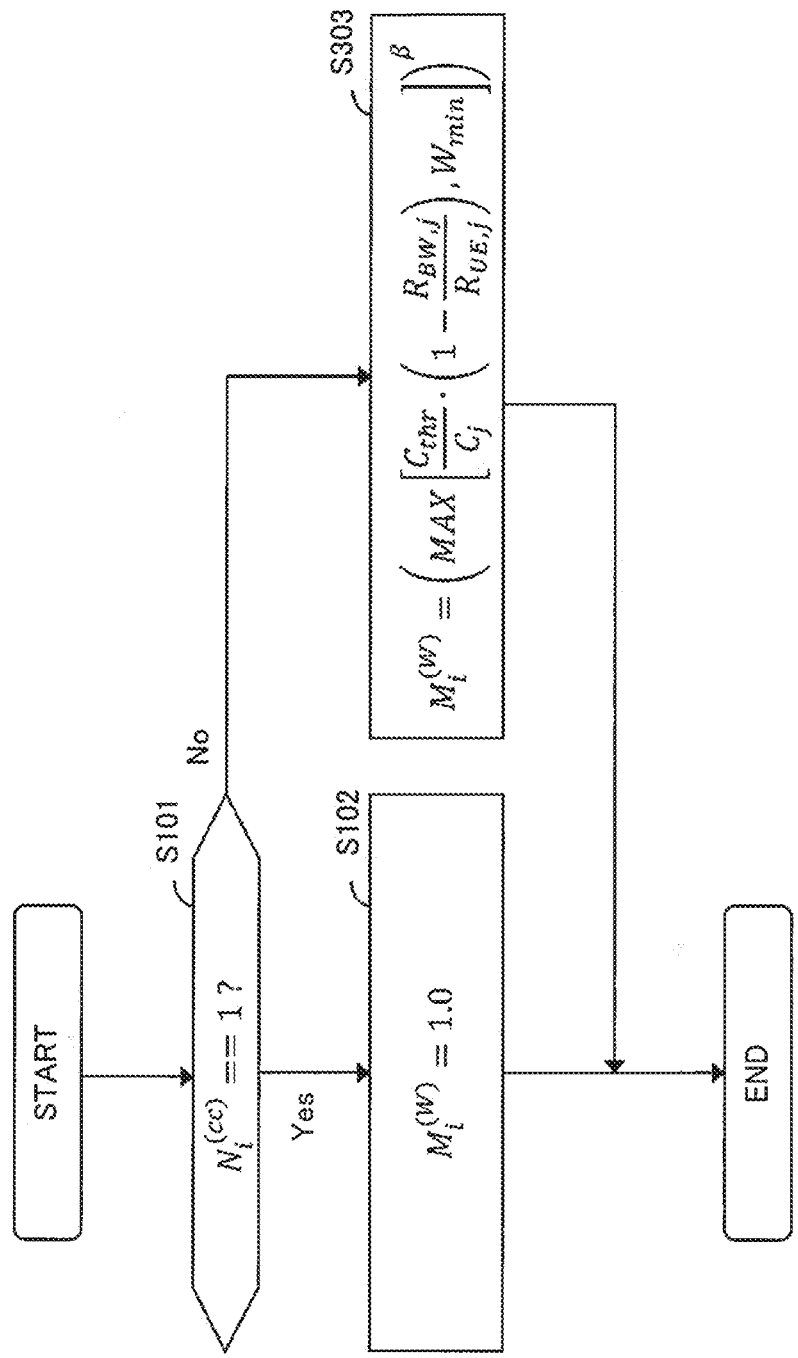
FIG. 10 is a flowchart presenting a method of calculating a communication band index in the third exemplary embodiment.
Figure 11:
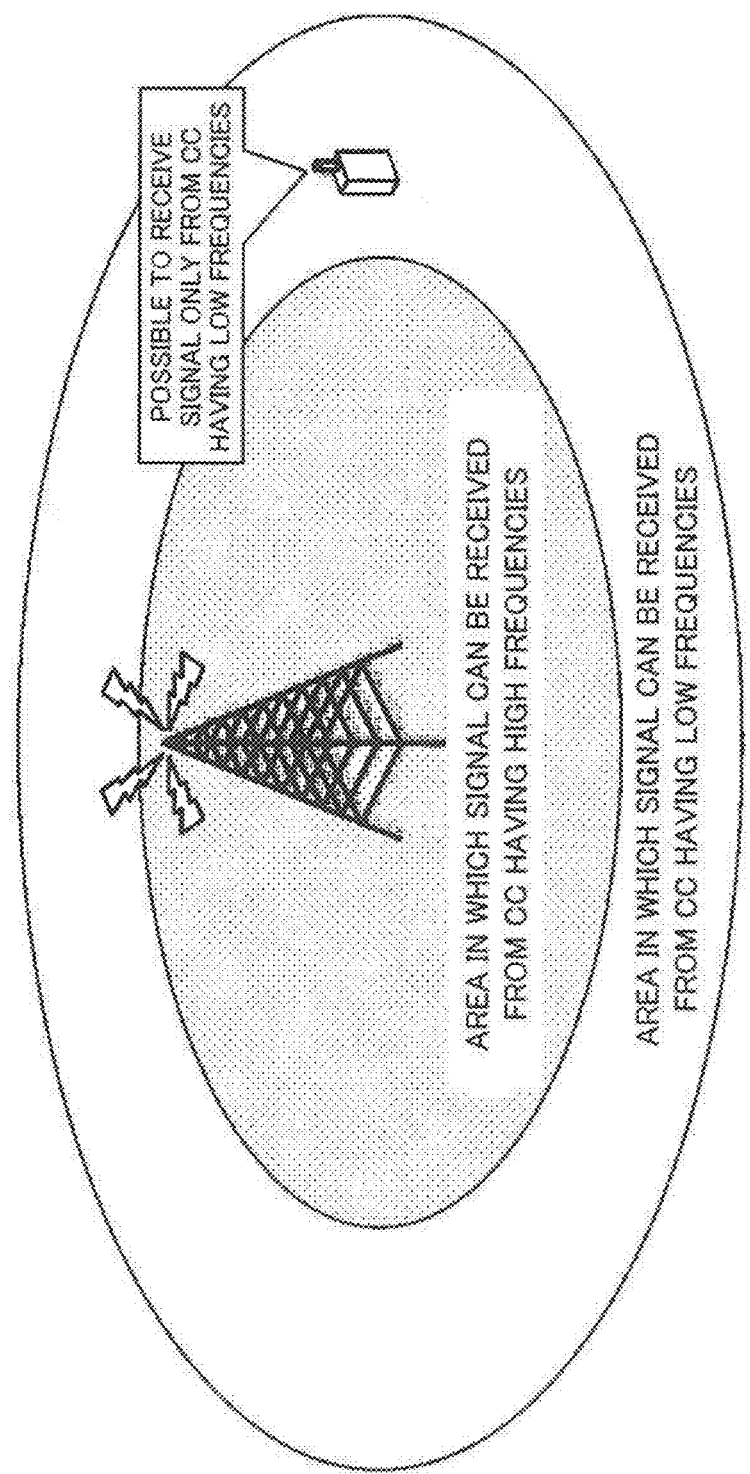
FIG. 11 is a diagram illustrating a configuration of a radio communication system employing a general technique.
Figure 12:
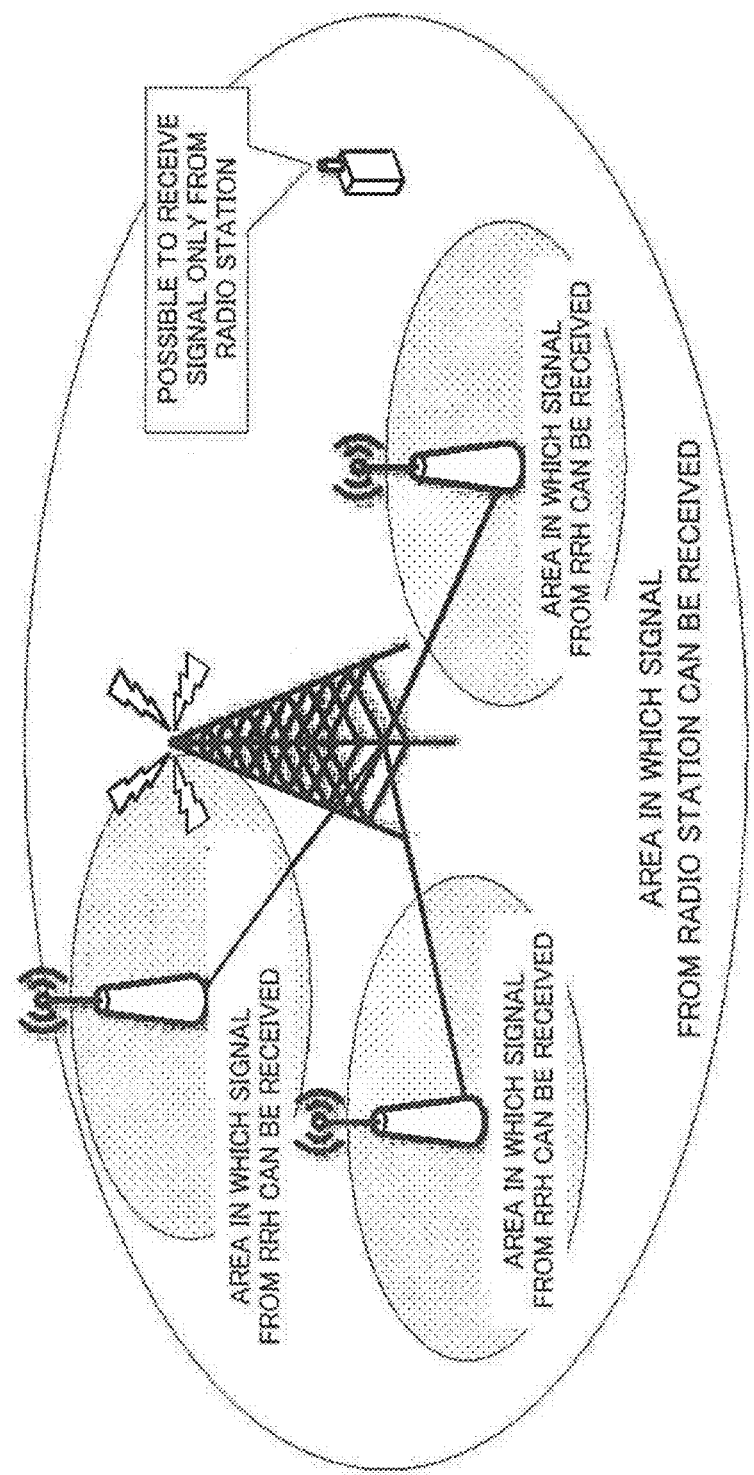
FIG. 12 is a diagram illustrating a configuration of a radio communication system employing a general technique.
Figure 13:
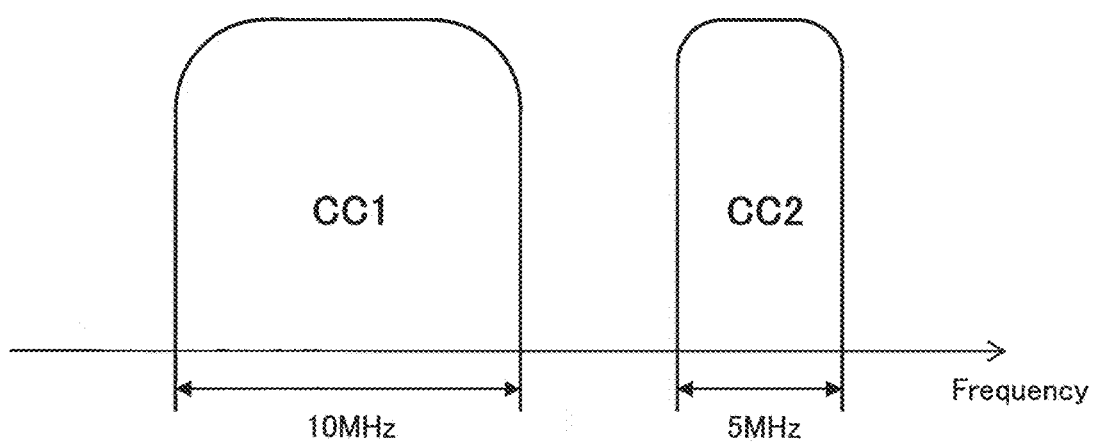
FIG. 13 is a diagram illustrating a system band of a wireless communication system employing the general technique.
Figure 14:
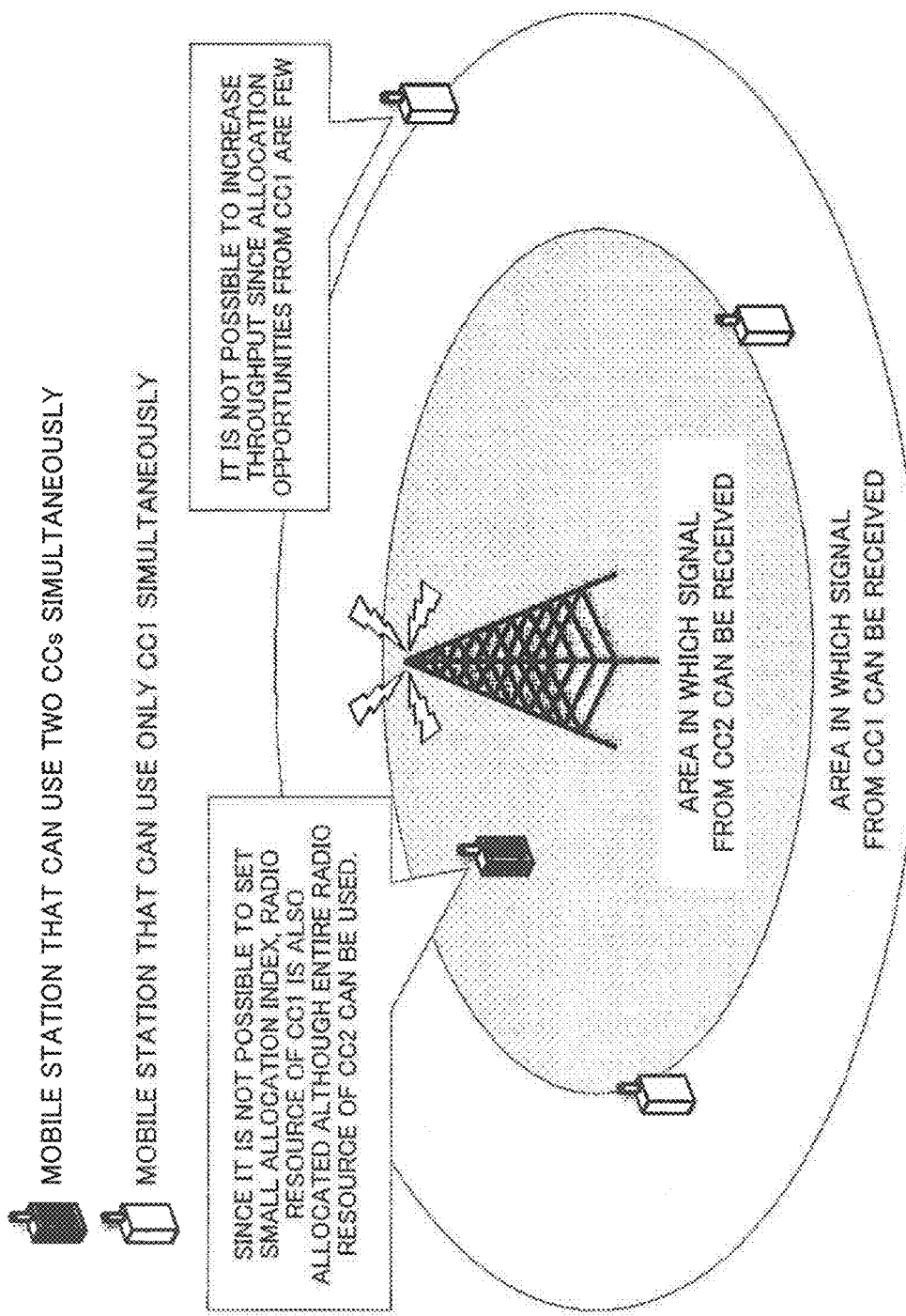
FIG. 14 is a diagram illustrating a problem of the general technique.
Figure 15:
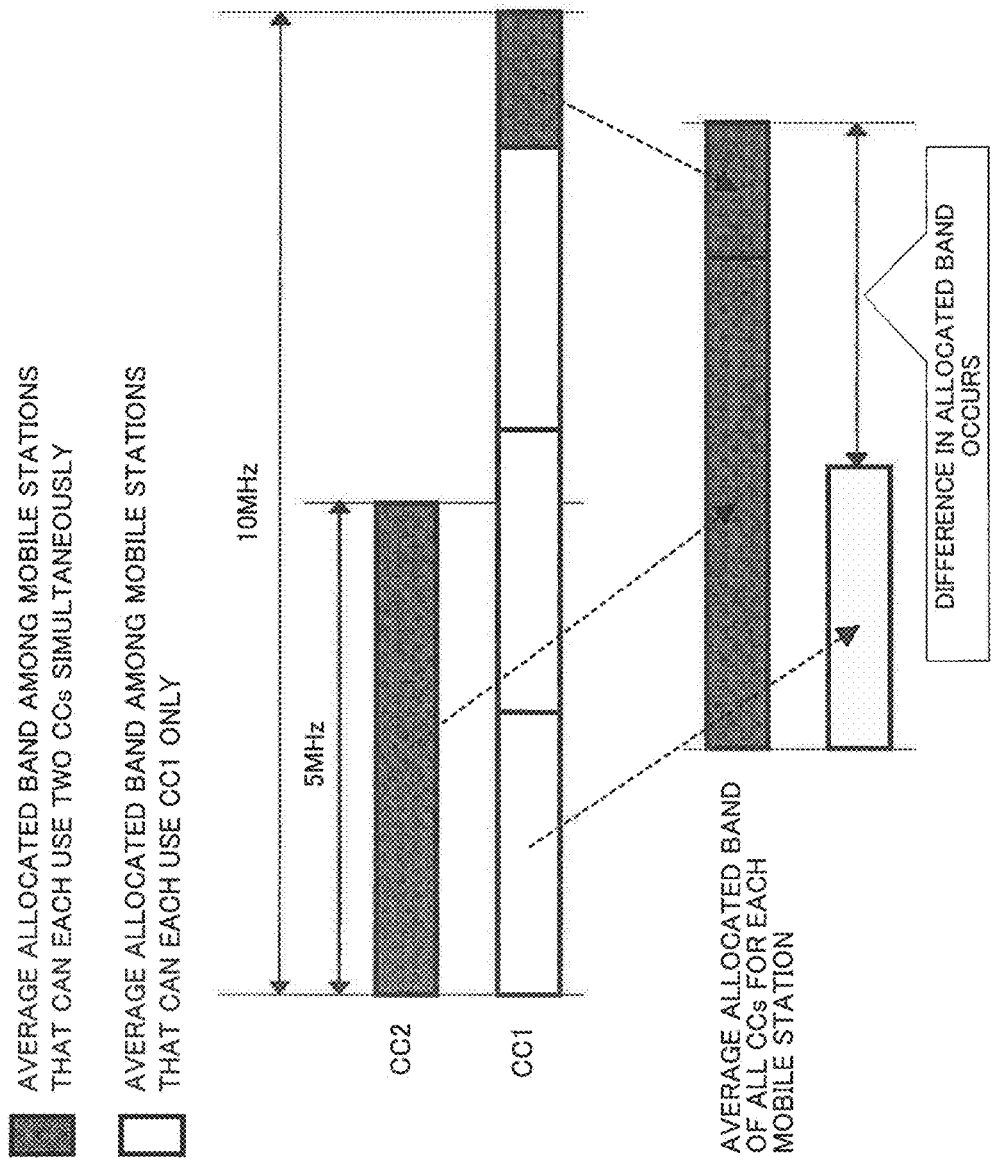
FIG. 15 is a diagram illustrating a problem of the general technique.
Figure 16:
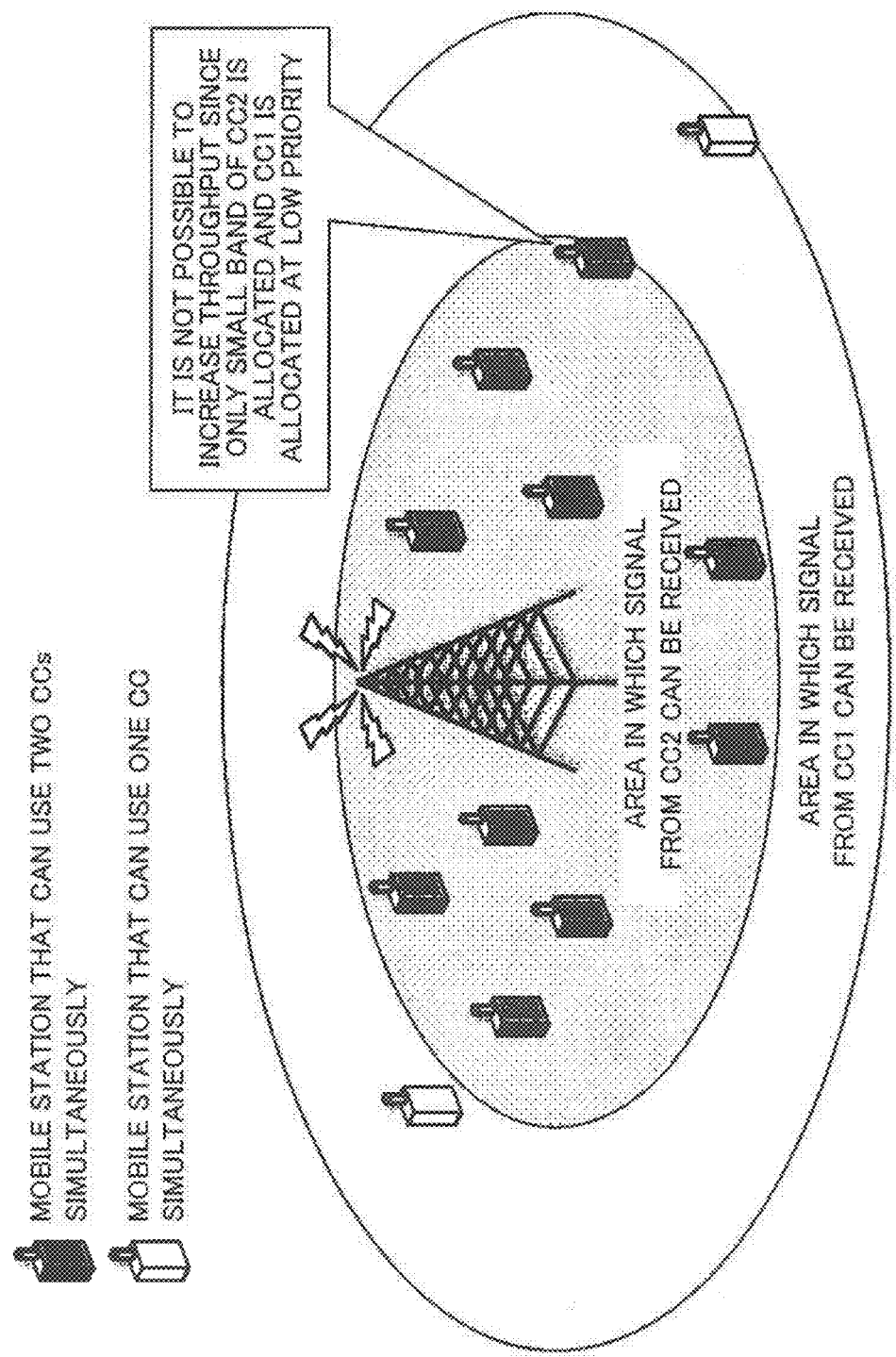
FIG. 16 is a diagram illustrating a problem of the general technique.

FIG. 10 illustrates an operation procedure in which the scheduler 604 of the radio station 600 calculates a communication band index of each mobile station 300. The radio station 600 performs the operations in FIG. 10 for each subframe. A subframe is a unit of time for radio resource allocation.

According to FIG. 10, Steps S103 in FIG. 3 is omitted and Step S303 is newly added. Description is given only of the operation in added Step S303.

In Step S102, when Equation (5) is not true (No in Step S102), the scheduler 604 calculates the communication band index $M_i^{(W)}$ of the mobile station 300 according to Equation (17) (Step S303). In Equation (17), j denotes the identification number of a communication area, $C_j$ denotes the radio capacity of the communication area having the identification number j, and $C_{thr}$ denotes a threshold value for radio capacity. In the exemplary embodiment, $C_{thr}$ is assumed to be $C_j$ of the cell 11.

[Math. 17]

$$M_i^{(W)} = \left(\text{MAX}\left[\frac{C_{thr}}{C_j} \cdot \left(1 - \frac{R_{BW,j}}{R_{UE,j}}\right), W_{min}\right]\right)^\beta \quad \text{Equation (17)}$$

The radio capacity $C_j$ is calculated according to Shannon's formula for communication capacity presented in Equation (18). In Equation (18), $SINR_j$ denotes the average SINR among the mobile stations 300 in the communication area having the identification number j.

[Math. 18]

$$C_j = \log_2(1 + SINR_j) \quad \text{Equation (18)}$$

Equation (17) is different from Equation (7) in that Equation (17) takes radio capacity into account. When the radio capacities are different between the CCs, the throughputs are not necessarily the same among the mobile stations 300 even when the average numbers of allocated RBs are the same. By performing weighting so that the smaller the communication capacity Cj of the communication area having the identification number j is, the larger the communication band index calculated according to Equation (7) becomes, the dispersion of the throughputs of the mobile stations 300 can be reduced.

As described above, according to the radio station 100 according to the third exemplary embodiment of the present invention, even when there is a difference of communication capacity between the CCs, allocation indices of the mobile stations 300 are calculated so that the throughputs of the mobile stations 300 are to be the same. Therefore, fairness of the throughputs among the mobile stations can be further improved compared with the first exemplary embodiment.

The invention of the present application is described above with reference to the above exemplary embodiments. However, the invention of the present application is not limited to the above-described exemplary embodiments. Various changes that can be understood by those skilled in the art may be made to the configuration and details of the invention of the present application within the scope of the invention of the present application.

For example, in the present exemplary embodiment, communication band indices are derived on the basis of the radio capacity calculated for each communication area. However, communication band indices may be derived, for each mobile station 300, on the basis of the radio capacity of the mobile station 300 calculated according to Equation (18).

In the present exemplary embodiment, the number of CCs included in the radio communication system 30 is assumed to be two. However, application is possible even when the number of CCs is three or more. In the radio communication system 30, a mobile station having a smaller number of CCs that can be used simultaneously can use only CCs to each of which a large number of mobile stations are connected, consequently resulting in expected throughput being low. To address this issue, from the viewpoint of fairness of throughputs, two CCs having the largest numbers of mobile stations are selected, and allocation indices are calculated as in the present exemplary embodiment for the mobile stations each having the number of CCs that can be used simultaneously is one of the two CCs and the mobile stations each having the number of CCs that can be used simultaneously is two. In this case, the number of CCs that can be used simultaneously is assumed to be two for each mobile station whose number of CCs that can be used simultaneously is three or more. As a result of this, it is possible to reduce the difference in throughput among the mobile stations each having a small number of CCs that can be used simultaneously and to thereby increase the lowest throughput of the mobile stations in the radio communication system.

Communication band indices calculated in the exemplary embodiment can be used in the radio communication system 10 in the first exemplary embodiment and the radio communication system 20 in the second exemplary embodiment. In addition, communication band indices calculated in the first exemplary embodiment can be used in the radio communication system 30 in the present exemplary embodiment.

(Supplementary Note 1)

A frequency block allocation method for a radio communication system in which a radio station and mobile stations perform radio communication by using a frequency block selected from a plurality of system bands, the frequency block allocation method including:

an allocation number determination step of determining number of system bands that can allocate to each mobile station;

a communication band index calculation step of calculating a communication band index on the basis of bandwidths and loads of the system bands according to the determined allocation number;

an allocation index calculation step of calculating an allocation index of the mobile station for each of the system bands by using the communication band index; and a frequency block allocation step of allocating frequency blocks to the mobile stations on the basis of the allocation indices.

(Supplementary Note 2)

The frequency block allocation method according to Supplementary Note 1, wherein the communication band index is calculated at least by using an expected value of an allocation bandwidth of the mobile station.

(Supplementary Note 3)

The frequency block allocation method according to Supplementary Note 2, wherein the communication band index is calculated on the basis of a ratio or difference in communication capacity between the system bands.

(Supplementary Note 4)

The frequency block allocation method according to any one of Supplementary Notes 1 to 3, wherein each of the loads is the number of mobile stations using the corresponding system band.

(Supplementary Note 5)

The frequency block allocation method according to any one of Supplementary Notes 1 to 3, wherein each of the loads is a traffic amount of the corresponding system band.

(Supplementary Note 6)

The frequency block allocation method according to any one of Supplementary Notes 1 to 5, wherein, as the bandwidth of each of the system bands, a bandwidth of an effective system band of a transmission device configured to transmit a signal for radio communication with the mobile station is used.

(Supplementary Note 7)

The frequency block allocation method according to any one of Supplementary Notes 1 to 5, wherein, in the communication band index calculation step, the communication band index is calculated on the basis of the bandwidth and load of the system band the load of which is high.

(Supplementary Note 8)

A radio communication system in which a radio station and mobile stations perform radio communication by using a frequency block selected from a plurality of system bands, the radio communication system including:

an allocation number determination means for determining number of system bands that can allocate to each mobile station;

a communication band index calculation means for calculating a communication band index on the basis of bandwidths and loads of the system bands according to the determined allocation number;

an allocation index calculation means for calculating an allocation index of the mobile station for each of the system bands by using the communication band index; and a frequency block allocation means for allocating frequency blocks to the mobile stations on the basis of the allocation indices.

(Supplementary Note 9)

The radio communication system according to Supplementary Note 8, wherein the communication band index is calculated at least by using an expected value of an allocation bandwidth of the mobile station.

(Supplementary Note 10)

The radio communication system according to Supplementary Note 9, wherein the communication band index is calculated on the basis of a ratio or difference in communication capacity between the system bands.

(Supplementary Note 11)

The radio communication system according to any one of Supplementary Notes 8 to 10, wherein each of the loads is the number of mobile stations using the corresponding system band.

(Supplementary Note 12)

The radio communication system according to any one of Supplementary Notes 8 to 11, wherein each of the loads is a traffic amount of the corresponding system band.

(Supplementary Note 13)

The radio communication system according to any one of Supplementary Notes 8 to 12, wherein, as the bandwidth of each of the system bands, a bandwidth of an effective system band of a transmission device configured to transmit a signal for radio communication with the mobile station is used.

(Supplementary Note 14)

The radio communication system according to any one of Supplementary Notes 8 to 12, wherein the communication band index calculation means calculates the communication band index on the basis of the bandwidth and load of the system band the load of which is high.

(Supplementary Note 15)

A frequency block allocation apparatus of a radio communication system in which a radio station and mobile stations perform radio communication by using a frequency block selected from a plurality of system bands, the allocation apparatus including:

an allocation number determination means for determining number of system bands that can allocate to each mobile station;

a communication band index calculation means for a calculating communication band index on the basis of bandwidths and loads of the system bands according to the determined allocation number;

an allocation index calculation means for calculating an allocation index of the mobile station for each of the system bands by using the communication band index; and a frequency block allocation means for allocating frequency blocks to the mobile stations on the basis of the allocation indices.

(Supplementary Note 16)

The allocation apparatus according to Supplementary Note 15, wherein the communication band index is calculated at least by using an expected value of an allocation bandwidth of the mobile station.

(Supplementary Note 17)

The allocation apparatus according to Supplementary Note 16, wherein each of the communication band indices is calculated on the basis of a ratio or difference in communication capacity between the system bands.

(Supplementary Note 18)

The radio communication system according to any one of Supplementary Notes 15 to 17, wherein each of the loads is the number of mobile stations using the corresponding system band.

(Supplementary Note 19)

The allocation apparatus according to any one of Supplementary Notes 15 to 18, wherein each of the loads is a traffic amount of the system band.

(Supplementary Note 20)

The allocation apparatus according to any one of Supplementary Notes 15 to 19, wherein, as the bandwidth of each of the system bands, a bandwidth of an effective system band of a transmission device configured to transmit a signal for radio communication with the mobile station is used.

(Supplementary Note 21)

The radio communication system according to any one of Supplementary Notes 15 to 19, wherein the communication band index calculation means calculates the communication band index on the basis of the bandwidth and load of the system band the load of which is high.

(Supplementary Note 22)

A program for a frequency block allocation apparatus of a radio communication system in which a radio station and mobile stations perform radio communication by using a frequency block selected from a plurality of system bands, the program causing the allocation apparatus to execute:

an allocation number determination process of determining number of system bands that can allocate to each mobile station;

a communication band index calculation process of calculating a communication band index on the basis of bandwidths and loads of the system bands according to the determined allocation number;

an allocation index calculation process of calculating an allocation index of each mobile station for each of the system bands by using the communication band index; and a frequency block allocation process of allocating frequency blocks to the mobile stations on the basis of the allocation indices.

(Supplementary Note 23)

The program according to Supplementary Note 22, wherein the communication band index is calculated at least by using an expected value of an allocation bandwidth of the mobile station.

(Supplementary Note 24)

The program according to Supplementary Note 23, wherein the communication band index is calculated on the basis of a ratio or difference in communication capacity between the system bands.

(Supplementary Note 25)

The program according to any one of Supplementary Notes 22 to 24, wherein each of the loads is the number of mobile stations using the corresponding system band.

(Supplementary Note 26)

The program according to any one of Supplementary Notes 22 to 25, wherein each of the loads is a traffic amount of the system band.

(Supplementary Note 27)

The program according to any one of Supplementary Notes 22 to 26, wherein, as the bandwidth of each of the system bands, a bandwidth of an effective system band of a transmission device configured to transmit a signal for radio communication with the mobile station is used.

(Supplementary Note 28)

The program according to any one of Supplementary Notes 22 to 26, wherein, in the communication band index calculation process, the communication band index is calculated on the basis of the bandwidth and load of the system band the load of which is high.

The present application claims the priority based on Japanese Patent Application No. 2013-247049, filed on Nov. 29, 2013, the entire disclosure of which is incorporated herein.

REFERENCE SIGNS LIST 10, 20, 30 Radio communication system
100, 600 Radio station
200-1, 200-2, 500 RRH
300-1, 300-2, 300-3, 300-4, 300-5, 300-6 Mobile station
400 Centralized controller
101 Radio station operation unit
102 Transmission/reception unit
103 Scheduler
103A Communication band index calculation unit
103B Allocation index calculation unit
103C Radio resource allocation unit
201, 603 Transmission/reception unit

What is claimed is:

1. A frequency block allocation method for a radio communication system in which one or more radio stations and mobile stations perform radio communication using a frequency block selected from a plurality of system bands, the frequency block allocation method comprising:

determining number of component carriers that can allocate to each mobile station;

calculating a communication band index, indicating an expected value of a band to be allocated for the each mobile station, based on bandwidths and loads of the component carriers according to the determined allocation number of the component carriers;

calculating an allocation index, which is expected upon allocation of the frequency block to the each mobile station, for each of the component carriers using the communication band index, an instantaneous rate and an average rate, which are expected upon allocation of the frequency block to the each mobile station; and allocating frequency blocks to the each mobile station based on the allocation indices.

2. The frequency block allocation method according to claim 1, wherein the communication band index is calculated based on a ratio or difference in communication capacity between the system bands.

3. The frequency block allocation method according to claim 1,
wherein each of the loads is the number of mobile stations using the corresponding component carrier.

4. The frequency block allocation method according to claim 1,
wherein each of the loads is a traffic amount of the corresponding component carrier.

5. The frequency block allocation method according to claim 1,
wherein a bandwidth of an effective component carrier, of a transmission device configured to transmit a signal for radio communication with the mobile station, is used as the bandwidth of each of the component carriers.

6. The frequency block allocation method according to claim 1,
wherein the calculating communication band index comprises calculating the communication band index based on the bandwidth and load of the component carrier the load of which is high among component carriers.

7. A radio communication system in which one or more radio stations and mobile stations perform radio communication using a frequency block selected from a plurality of system bands, the radio communication system comprising:

at least one memory configured to store instructions: and
at least one processor configured to execute the stored instructions to implement:

an allocation number determination unit configured to determine number of component carriers that can allocate to each mobile station;

a communication band index calculation unit configured to calculate a communication band index, indicating an expected value of a band to be allocated for the each mobile station, based on bandwidths and loads of the component carriers according to the determined allocation number of the component carriers;

an allocation index calculation unit configured to calculate an allocation index, which is expected upon allocation of the frequency block to the each mobile station, for each of the component carriers using the communication band index, an instantaneous rate and an average rate, which are expected upon allocation of the frequency block to the each mobile station; and a frequency block allocation unit configured to allocate frequency blocks to the each mobile station based on the allocation indices.

8. A frequency block allocation apparatus of a radio communication system in which one or more radio stations and mobile stations perform radio communication using a frequency block selected from a plurality of system bands, the allocation apparatus comprising:

at least one memory configured to store instructions: and at least one processor configured to execute the stored instructions to implement:

an allocation number determination unit configured to determine number of component carriers that can allocate to each mobile station;

a communication band index calculation unit configured to calculate communication band index, indicating an expected value of a band to be allocated for the each mobile station, based on bandwidths and loads of the component carriers according to the determined allocation number of the component carriers;

an allocation index calculation unit configured to calculate an allocation index, which is expected upon allocation of the frequency block to the each mobile station, for each of the component carriers using the communication band index an instantaneous rate and an average rate, which are expected upon allocation of the frequency block to the each mobile station; and a frequency block allocation unit configured to allocate frequency blocks to the each mobile station based on the allocation indices.

9. A non-transitory computer readable medium storing a program for a frequency block allocation apparatus of a radio communication system in which one or more radio stations and mobile stations perform radio communication using a frequency block selected from a plurality of system bands, the program causing the allocation apparatus to execute:

determining number of component carriers that can allocate to each mobile station;

calculating a communication band index, indicating an expected value of a band to be allocated for the each mobile station, based on bandwidths and loads of the component carriers according to the determined allocation number of the component carriers;

calculating an allocation index, which is expected upon allocation of the frequency block to the each mobile station, for each of the component carriers using the communication band index, an instantaneous rate and an average rate, which are expected upon allocation of the frequency block to the each mobile station; and allocating frequency blocks to the each mobile station based on the allocation indices.

* * * * *